United States Patent
Nalawade et al.

(10) Patent No.: US 7,831,772 B2
(45) Date of Patent: Nov. 9, 2010

(54) SYSTEM AND METHODOLOGY PROVIDING MULTIPLE HETEROGENEOUS BUFFER CACHES

(75) Inventors: Vaibhav A. Nalawade, Pune (IN); Vadiraja P. Bhatt, Bangalore (IN); KantiKiran K. Pasupuleti, Visakhapatnam (IN)

(73) Assignee: Sybase, Inc., Dublin, CA (US)

( * ) Notice: Subject to any disclaimer, the term of this patent is extended or adjusted under 35 U.S.C. 154(b) by 480 days.

(21) Appl. No.: 11/609,583

(22) Filed: Dec. 12, 2006

(65) Prior Publication Data

US 2008/0140937 A1    Jun. 12, 2008

(51) Int. Cl.
G06F 12/00 (2006.01)
G06F 13/00 (2006.01)
G06F 13/28 (2006.01)
G06F 7/00 (2006.01)
G06F 17/30 (2006.01)

(52) U.S. Cl. .................. 711/119; 711/129; 711/148; 711/E12.021; 711/E21.077; 707/736; 707/802

(58) Field of Classification Search .............. 711/119, 711/129, 148
See application file for complete search history.

(56) References Cited

U.S. PATENT DOCUMENTS

| 6,061,763 | A * | 5/2000 | Rubin et al. ............. 711/129 |
|---|---|---|---|
| 6,098,096 | A | 8/2000 | Tsirigotis et al. |
| 6,275,916 | B1 | 8/2001 | Weldon et al. |
| 6,370,619 | B1 | 4/2002 | Ho et al. |
| 6,389,513 | B1 | 5/2002 | Closson |
| 6,446,070 | B1 | 9/2002 | Arnold et al. |
| 6,463,509 | B1 | 10/2002 | Teoman et al. |
| 6,466,947 | B2 | 10/2002 | Arnold et al. |
| 6,470,360 | B1 | 10/2002 | Vaitheeswaran |
| 6,470,422 | B2 | 10/2002 | Cai et al. |
| 6,480,936 | B1 | 11/2002 | Ban et al. |
| 6,490,670 | B1 | 12/2002 | Collins et al. |
| 6,564,230 | B2 | 5/2003 | Bamford et al. |
| 6,591,346 | B1 | 7/2003 | Kottapurath |
| 6,591,347 | B2 | 7/2003 | Tischler et al. |
| 6,598,094 | B1 | 7/2003 | Wollrath et al. |
| 6,598,119 | B2 | 7/2003 | Becker et al. |
| 6,609,126 | B1 | 8/2003 | Smith et al. |
| 6,631,446 | B1 | 10/2003 | Cherkauer et al. |
| 6,633,862 | B2 | 10/2003 | Thompson |
| 6,643,650 | B1 | 11/2003 | Slaughter et al. |
| 6,662,196 | B2 | 12/2003 | Holenstein et al. |
| 6,701,359 | B1 | 3/2004 | Calabrez et al. |

(Continued)

*Primary Examiner*—Matt Kim
*Assistant Examiner*—Ralph A Verderamo, III
(74) *Attorney, Agent, or Firm*—John A. Smart; G. Mack Riddle

(57) ABSTRACT

A method for temporarily storing data objects in memory of a distributed system comprising a plurality of servers sharing access to data comprises steps of: reserving memory at each of the plurality of servers as a default data cache for storing data objects; in response to user input, allocating memory of at least one of the plurality of servers as a named cache reserved for storing a specified type of data object; in response to an operation at a particular server requesting a data object, determining whether the requested data object is of the specified type corresponding to the named cache at the particular server; if the data object is determined to be of the specified type corresponding to the named cache, storing the requested data object in the named cache at the particular server; and otherwise, using the default data cache for storing the requested data object.

43 Claims, 7 Drawing Sheets

U.S. PATENT DOCUMENTS

| | | |
|---|---|---|
| 6,704,756 B2 | 3/2004 | Wollrath et al. |
| 6,718,349 B2 | 4/2004 | Weedon |
| 6,728,726 B1 | 4/2004 | Bernstein et al. |
| 6,728,840 B1 | 4/2004 | Shatil et al. |
| 6,741,997 B1 | 5/2004 | Liu et al. |
| 6,769,048 B2 | 7/2004 | Goldberg et al. |
| 6,789,170 B1 | 9/2004 | Jacobs et al. |
| 6,792,436 B1 | 9/2004 | Zhu et al. |
| 6,829,680 B1 | 12/2004 | Sugumar et al. |
| 6,836,774 B2 | 12/2004 | Melbin |
| 6,848,028 B1 | 1/2005 | Sugumar et al. |
| 6,877,066 B2 | 4/2005 | Benfield et al. |
| 6,898,603 B1 | 5/2005 | Petculescu et al. |
| 6,917,976 B1 | 7/2005 | Slaughter et al. |
| 6,944,711 B2 | 9/2005 | Mogi et al. |
| 6,957,427 B1 | 10/2005 | Wollrath et al. |
| 6,973,493 B1 | 12/2005 | Slaughter et al. |
| 7,035,990 B1 | 4/2006 | Muhlbauer |
| 7,103,586 B2 | 9/2006 | Holenstein et al. |
| 7,117,535 B1 | 10/2006 | Wecker |
| 7,124,249 B1 | 10/2006 | Darcy |
| 7,188,251 B1 | 3/2007 | Slaughter et al. |
| 7,210,148 B2 | 4/2007 | Arnold et al. |
| 7,222,117 B1 | 5/2007 | McGrogan |
| 7,243,356 B1 | 7/2007 | Saulpaugh et al. |
| 7,296,275 B2 | 11/2007 | Colley et al. |
| 7,421,562 B2 | 9/2008 | Bhatt et al. |
| 7,444,644 B1 | 10/2008 | Slaughter et al. |
| 2003/0115421 A1* | 6/2003 | McHenry et al. ............ 711/133 |
| 2006/0288088 A1* | 12/2006 | Taneja ........................ 709/218 |

* cited by examiner

SYSTEM AND METHODOLOGY PROVIDING MULTIPLE HETEROGENEOUS BUFFER CACHES

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size: 54554 Bytes, created: Dec. 8, 2006 7:42:16 AM; Object ID: File No. 1; Object Contents: Source code.

BACKGROUND OF THE INVENTION

1. Field of the Invention

The present invention relates to data storage management and, more particularly, to a system and methodology providing multiple heterogeneous buffer caches in distributed database management systems.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Part I (especially Chapters 1-4), Addison Wesley, 2000.

In operation, a DBMS frequently needs to retrieve data from or persist data to storage devices such as disks. Unfortunately, access to such storage devices can be somewhat slow. To speed up access to data, databases typically employ a "cache" or "buffer cache" which is a section of relatively faster memory (e.g., RAM) allocated to store recently used data objects. Throughout the remainder of the specification, this faster memory will simply be referred to as "memory," as distinguished from mass storage devices such as disks. Memory is typically provided on semiconductor or other electrical storage media and is coupled to the CPU via a fast data bus which enables data maintained in memory to be accessed more rapidly than data stored on disks.

As memory provided on computer systems has a limited size, some method must be employed for managing what content is maintained in cache memory. Conventionally, data storage systems employ some form of a "least recently used—most recently used" (LRU/MRU) protocol to queue data objects in the buffer cache. Basically, such LRU/MRU protocol moves the "most recently used" data object to the head of the queue while simultaneously moving data objects that have not been used one step towards the end of the queue. Thus, infrequently used objects migrate toward the end of the queue, and ultimately are deleted from the buffer cache to make room for new data objects copied from disks (i.e., infrequently used objects are displaced by more recently used objects). In this manner, the most recently used data objects are the only objects stored in the buffer cache at any given time.

Unfortunately, the basic LRU/MRU memory management protocol is subject to a number of limitations. As a result, other approaches providing for greater efficiency in management of data objects in cache have been adopted. For example, U.S. Pat. No. 6,061,763 provides for partitioning computer memory provided in a single cache, symmetric multiprocessor (SMP) system into plurality of buffer caches, each of which buffer caches is separately addressable and may be configured to retain data objects meeting specified criteria. Although this approach provides considerable performance improvements over the basic LRU/MRU protocol, problems remain in providing fast access to data in database systems.

Among the issues not addressed by current solutions is the fact that these existing solutions are not designed to address some of the problems faced in more modern distributed database systems. In recent years, users have demanded that database systems be continuously available, with no downtime, as they are frequently running applications that are critical to business operations. In response, distributed database systems have been introduced to provide for greater reliability. More recently, "Shared Disk Cluster" database systems have been introduced to provide increased reliability and scalability. A "Shared Disk Cluster" (or "SDC") database system is a system that has a cluster of two or more database servers having shared access to a database on disk storage. The term "cluster" refers to the fact that these systems involve a plurality of networked server nodes which are clustered together to function as a single system. Each node in the cluster usually contains its own CPU and memory and all nodes in the cluster communicate with each other, typically through private interconnects. "Shared disk" refers to the fact that two or more database servers share access to the same disk image of the database. Shared Disk Cluster database systems provide for transparent, continuous availability of the applications running on the cluster with instantaneous failover amongst servers in the cluster. When one server is down (e.g., for upgrading the CPU) the applications are able to continue to operate against the shared data using the remaining machines in the cluster, so that a continuously available solution is provided. Shared Disk Cluster systems also enable users to address scalability problems by simply adding additional machines to the cluster, without major data restructuring and the associated system downtime that is common in prior SMP environments.

Although Shared Disk Cluster database systems provide increased availability and reliability, they also introduce a number of new challenges. Among these challenges are providing for memory management given that multiple servers share access to a common disk image of the database. With multiple servers sharing access to data, a standard global cache configuration is not a good solution for providing efficient access to data that is frequently used at a particular server in the cluster. In order to obtain better performance in this distributed database system environment, what is needed is the ability to define and provide caches on each server in the cluster. The solution should provide fast access to data objects frequently used by a particular application by localizing the access of the data pertaining to the application on a particular server instance(s) serving that application. Ideally, the solution should enable configuration of different caches on different instances to provide users and administrators increased flexibility in structuring the cache configuration at a particular instance in the cluster to best support the workload at that instance. The present invention provides a solution for these and other needs.

SUMMARY OF THE INVENTION

A system and methodology providing multiple heterogeneous buffer caches is described. In one embodiment, for example, in a distributed system comprising a plurality of servers sharing access to data, a method of the present invention is described for temporarily storing data objects in memory of the distributed system, the method comprises steps of: reserving a portion of memory at each of the plurality of servers as a default data cache for temporarily storing data objects; in response to user input, allocating a portion of memory of at least one of the plurality of servers as a named cache reserved for temporarily storing a specified type of data object; in response to an operation at a particular server requesting a data object, determining whether the requested data object is of the specified type corresponding to the named cache at the particular server; if the data object is determined to be of the specified type corresponding to the named cache at the particular server, temporarily storing the requested data object in the named cache at the particular server; and otherwise, using the default data cache at the particular server for temporarily storing the requested data object.

In another embodiment, for example, in a distributed database system comprising a plurality of servers sharing access to data, a system of the present invention for storing data objects in memory is described that comprises: a named cache comprising an allocated portion of memory of at least one of the plurality of servers for storing specified data objects; a module for binding data objects to the named cache based on user input; a module for determining, in response to an operation at a particular server requesting a data object, whether the requested data object has a binding to the named cache at the particular server; a module for storing the requested data object in the named cache at the particular server if the data object is determined to have a binding to the named cache; and a default data cache comprising a reserved portion of memory at each of the plurality of servers for temporarily storing data objects without a binding to the named cache.

In yet another embodiment, for example, a system of the present invention for managing storage of data objects in a distributed database system is described that comprises: one or more storage devices on which data objects of a database are persistently stored; a plurality of database servers sharing access to the database, wherein each of the plurality of database servers includes memory for temporarily storing data objects; a portion of the memory of at least one of the plurality of database servers allocated as a named buffer cache for specified data objects, so as to provide more efficient access to the specified data objects in response to database operations; a module for binding specified data objects to the named buffer cache based on user input, so that the specified data objects will be stored in the named buffer cache during database operations; and a module for storing a particular data object requested by a database operation at a given database server in the named buffer cache if the particular database object is bound to the name cache available at the given database server.

DETAILED DESCRIPTION

Glossary

Figure 1:
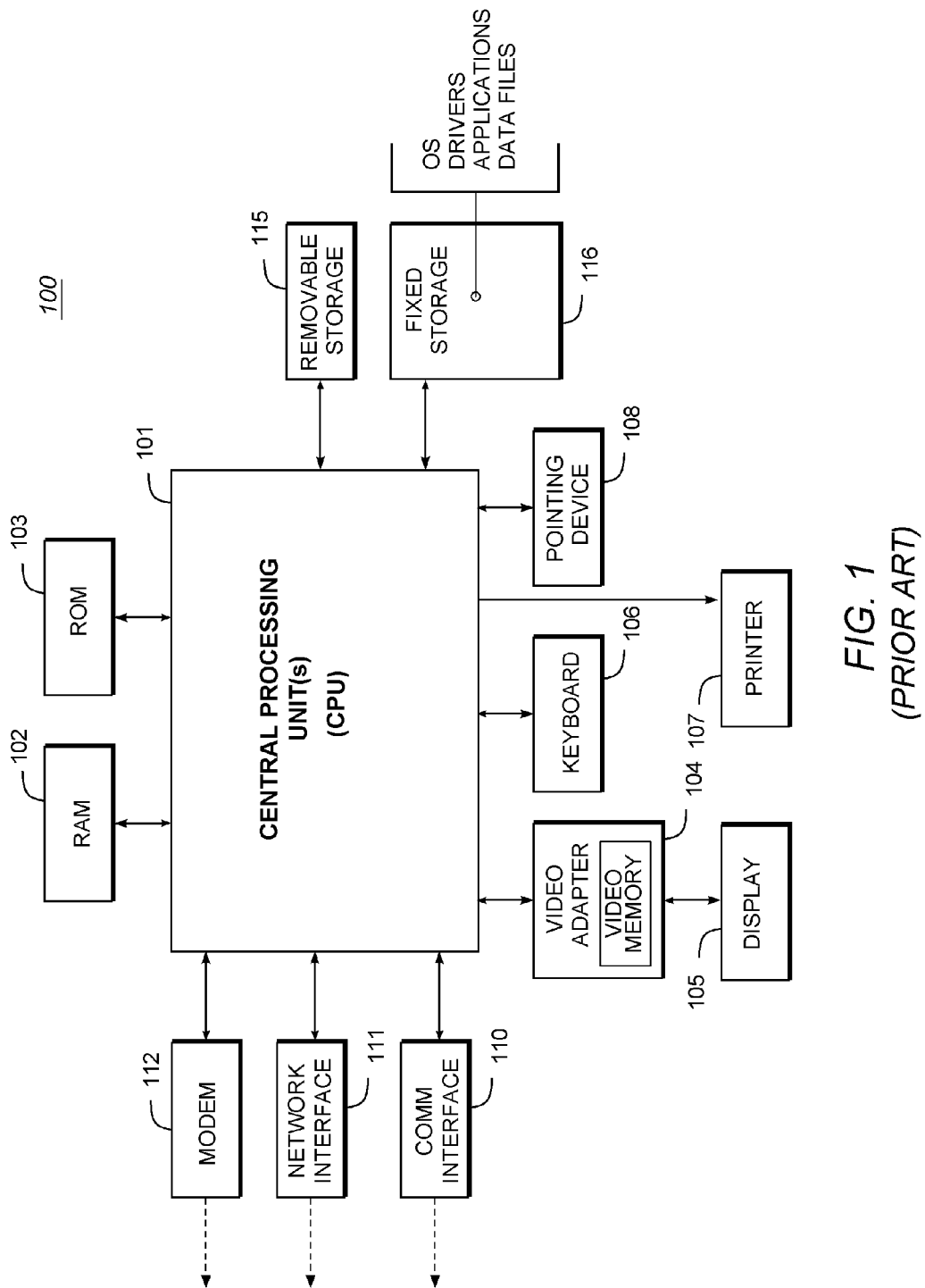
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

BCM: refers to buffer coherency manager which is a process provided in the currently preferred embodiment of the present invention for handling page transfer requests from remote instances.

Cache: a cache is a section of relatively faster memory (e.g., RAM) allocated to temporarily store data objects so as to provide faster access to such objects (e.g., when compared to access of such objects from disk).

Cache id: the cache descriptor id used to uniquely represent a named cache constructed in accordance with the present invention.

Cluster Coordinator Instance: When a non-coordinator instance goes down, the recovery of the failed instance is done by a designated cluster coordinator instance. However if the coordinator instance does down, a new coordinator is selected which will do the recovery.

Clustered Server: A clustered server refers to a database server which runs on a Shared Disk Cluster and jointly manages a single installation of the database on the shared disks.

Clustered Server Number: a number that, in the presently preferred embodiment of the present invention, uniquely identifies a named clustered server in a Shared Disk Cluster. The clustered server number is assigned to a named clustered server as part of the cluster configuration. In the presently preferred embodiment, the clustered server number can range from one to maximum configurable clustered servers and, similar to the clustered server name, cannot be changed while the cluster is running.

Configuration file or config file: refers to the configuration file of a clustered server, which helps in configuring the server at boot time. This configuration file contains parameters which define the number of connections the server should handle, the number of lock structures it can allocate, and so forth. When dynamic parameters are changed, the changes are also written to the config file to make the changes persistent.

Failback: refers to the movement of a logical cluster from a failover instance back to a primary instance once the primary instance is back online.

Failover cache: a cache that can be used for recovery purposes.

Instance or Server Instance: A clustered server in a Shared Disk Cluster.

Interfaces file: The term interfaces file refers to the standard DBMS interfaces file or any other Directory Control Layer (such as LDAP, etc.) from which connection related information for a dataserver (such as the server name, host name/IP address, protocol, port number, security options etc.) is obtained.

Logical Cluster: A service oriented method of partitioning a physical cluster so that multiple application services can be setup. Key elements of a logical cluster are resources that the logical cluster runs on, routing rules that associate tasks to the logical cluster, and service management. Logical clusters allow for more fine-grained management of the workload within the cluster by allowing applications to connect to logical clusters rather than the physical cluster.

Logical Failover: refers to the movement of a logical cluster from the instance it is currently running on to a pre-designated failover instance should the current instance go offline or down.

Named Caches: refers to the feature provided by the present invention which enables user(s) to define caches on one or more specific server instance(s) in the cluster for specific purposes as described in more detail herein. Objects can be bound to the defined named caches so that the pages of the objects will use the specific named cache. In the currently preferred embodiment of the present invention, two types of named caches are provided which are referred to herein as "global" caches and "local" caches.

Node (Instance) Failover: refers to the possibility of an instance in the cluster going down due to software or hardware failure, resulting in a surviving coordinator instance taking action to recover the instance.

Object Binding: object binding refers to a feature of the present invention which enables data objects to be registered to use a specific named cache defined for a particular server instance(s) as set forth herein. In the presently preferred embodiment, specified data objects are generally bound to registered named caches so that the server will use the named cache to cache the pages for the specified objects.

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. The standard user and application program interface to a relational database is the structured query language (SQL), defined below.

Scope: implies the set of instances in the cluster. Instances in the logical cluster imply a set.

SDC: SDC stands for Shared Disk Cluster, which is a system that has multiple database servers on two or more machines managing the same disk image of the database, by having shared access to disk storage.

SMP: SMP stands for symmetric multi-processing system, which is a system comprised of multiple processors (CPUs) and a single RAM memory, which has a single instance of the operating system (O/S) running on it. All the CPUs serve and run all the functionality of the O/S and application symmetrically.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5)1999), the disclosure of which is hereby incorporated by reference.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware and Software (e.g., for Desktop and Server Computers)

The present invention may be implemented on a conventional or general-purpose computer system, such as an IBM-compatible personal computer (PC) or server computer. FIG.

1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, a HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

A software system is typically provided for controlling the operation of the computer system 100. The software system, which is usually stored in system memory (RAM) 102 and on fixed storage (e.g., hard disk) 116, includes a kernel or operating system (OS) which manages low-level aspects of computer operation, including managing execution of processes, memory allocation, file input and output (I/O), and device I/O. The OS can be provided by a conventional operating system, Microsoft Windows NT, Microsoft Windows 2000, Microsoft Windows XP, or Microsoft Windows Vista (Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system 100. The application(s) or other software intended for use on the computer system may be "loaded" into memory 102 from fixed storage 116 or may be downloaded from an Internet location (e.g., Web server). A graphical user interface (GUI) is generally provided for receiving user commands and data in a graphical (e.g., "point-and-click") fashion. These inputs, in turn, may be acted upon by the computer system in accordance with instructions from OS and/or application(s). The graphical user interface also serves to display the results of operation from the OS and application(s).

Client-Server Database Management System

Figure 2:
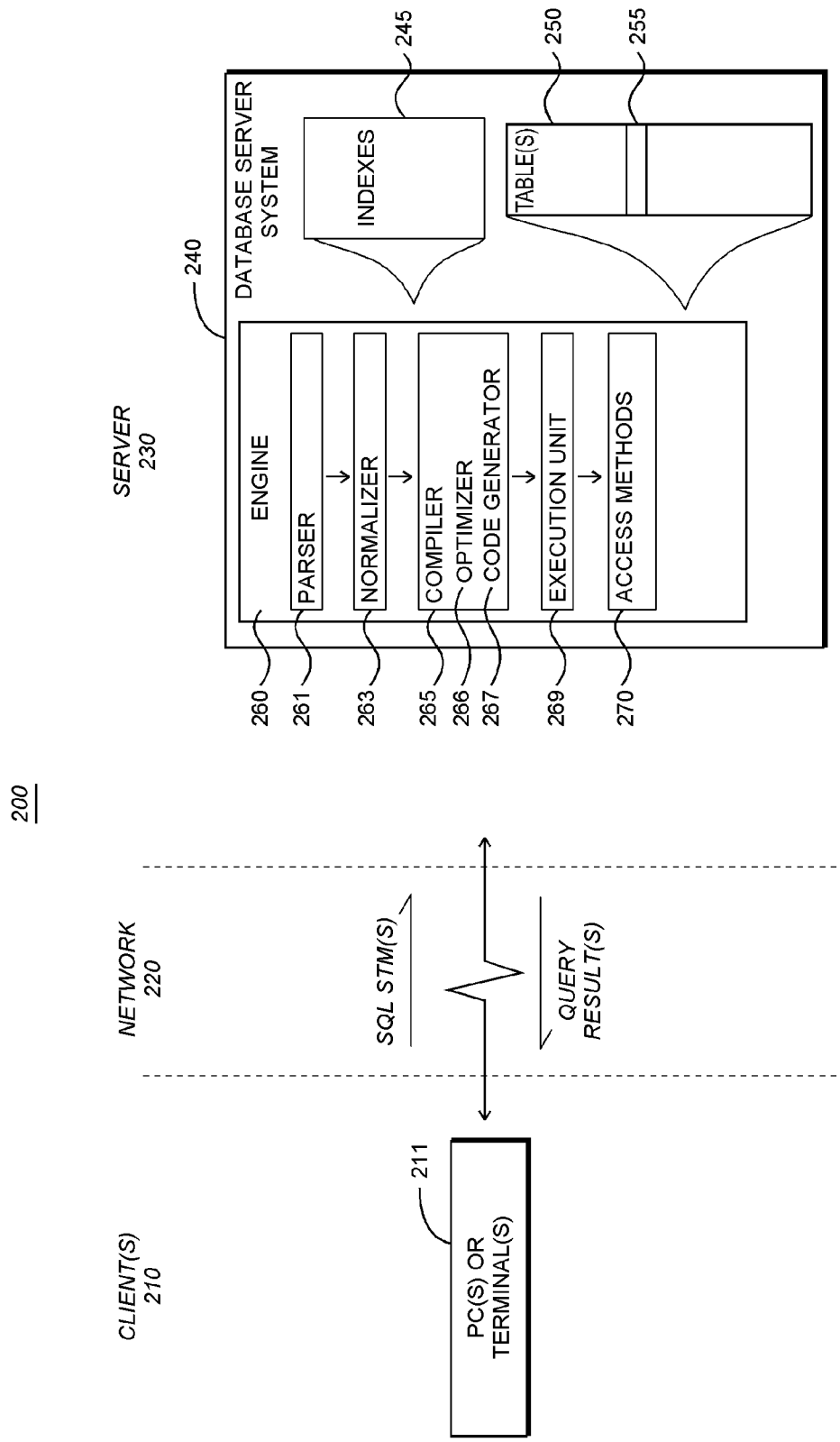
FIG. 2 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 2 illustrates the general structure of a client/server database system 200 suitable for implementing the present invention. As shown, the system 200 comprises one or more client(s) 210 connected to a server 230 via a network 220. Specifically, the client(s) 210 comprise one or more standalone terminals 211 connected to a database server system 240 using a conventional network. In an exemplary embodiment, the terminals 211 may themselves comprise a plurality of standalone workstations, dumb terminals, or the like, or comprise personal computers (PCs) such as the above-described system 100. Typically, such units would operate under a client operating system, such as a Microsoft® Windows client operating system (e.g., Microsoft® Windows 95/98, Windows 2000, or Windows XP).

The database server system 240, which comprises Sybase® Adaptive Server® Enterprise (available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.), UNIX (Novell), Solaris (Sun), or Linux (Red Hat). The network 220 may be any one of a number of conventional network systems, including a Local Area Network (LAN) or Wide Area Network (WAN), as is known in the art (e.g., using Ethernet, IBM Token Ring, or the like). The network 220 includes functionality for packaging client calls in the well-known Structured Query Language (SQL) together with any parameter information into a format (of one or more packets) suitable for transmission to the database server system 240.

Client/server environments, database servers, and networks are well documented in the technical, trade, and patent literature. For a discussion of Sybase®-branded database servers and client/server environments generally, see, e.g., Nath, A., "The Guide to SQL Server", Second Edition, Addison-Wesley Publishing Company, 1995. For a description of Sybase® Adaptive Server® Enterprise, see, e.g., "Adaptive Server Enterprise 12.5.1 Collection: (1) Core Documentation Set and (2) Installation and Configuration," available from Sybase, Inc. of Dublin, Calif. This product documentation is available via the Internet (e.g., currently at sybooks.sybase.com/as.html). The disclosures of the foregoing are hereby incorporated by reference.

In operation, the client(s) 210 store data in, or retrieve data from, one or more database tables 250, as shown at FIG. 2. Data in a relational database is stored as a series of tables, also called relations. Typically resident on the server 230, each table itself comprises one or more "rows" or "records" (tuples) (e.g., row 255 as shown at FIG. 2). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 210 issue one or more SQL commands to the server 230. SQL commands may specify, for instance, a query for retrieving particular data (i.e., data records meeting the query condition) from the database table(s) 250. In addition to retrieving the data from database server table(s) 250, the clients 210 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 210 (via network 220) are processed by the engine 260 of the database server system 240. The engine 260 itself comprises a parser 261, a normalizer 263, a compiler 265, an execution unit 269, and an access methods 270. Specifically, the SQL statements are passed to the parser 261 which converts the statements into a query tree—a binary tree data structure which represents the components of the query in a format selected for the convenience of the system. In this regard, the parser 261 employs conventional parsing methodology (e.g., recursive descent parsing).

The query tree is normalized by the normalizer 263. Normalization includes, for example, the elimination of redundant data. Additionally, the normalizer 263 performs error checking, such as confirming that table names and column names which appear in the query are valid (e.g., are available and belong together). Finally, the normalizer 263 can also look-up any referential integrity constraints which exist and add those to the query.

After normalization, the query tree is passed to the compiler 265, which includes an optimizer 266 and a code generator 267. The optimizer 266 is responsible for optimizing the query tree. The optimizer 266 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 267 translates the query execution plan selected by the query optimizer 266 into executable form for execution by the execution unit 269 using the access methods 270.

All data in a typical relational database system is stored in pages on a secondary storage device, usually a hard disk. Typically, these pages may range in size from 1 Kb to 32 Kb, with the most common page sizes being 2 Kb and 4 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool.

I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed. This can be done by using data structures and algorithms that maximize the use of pages that are known to reside in the cache. Alternatively, it can be done by being more selective about what pages are loaded into the cache in the first place. An additional consideration with respect to I/O is whether it is sequential or random. Due to the construction of hard disks, sequential I/O is much faster then random access I/O. Data structures and algorithms encouraging the use of sequential I/O can realize greater performance.

For enhancing the storage, retrieval, and processing of data records, the server 230 maintains one or more database indexes 245 on the database tables 250. Indexes 245 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a RID. This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter 'A'.

Although client/server database systems remain in wide use, the present invention, in its currently preferred embodiment, is implemented in a Shared Disk Cluster database system environment, which provides several advantages compared to prior art client/server database systems. Among these advantages are that a Shared Disk Cluster system can be more easily expanded. Users may easily add additional servers in order to increase system capacity and provide improved performance without major data restructuring and the associated system downtime. This also enables users to purchase hardware in smaller increments as needed to keep up with growth. Other advantages of a Shared Disk Cluster architecture include lower total cost of ownership (TCO), continuous availability, high performance, and single system presentation.

Figure 3:
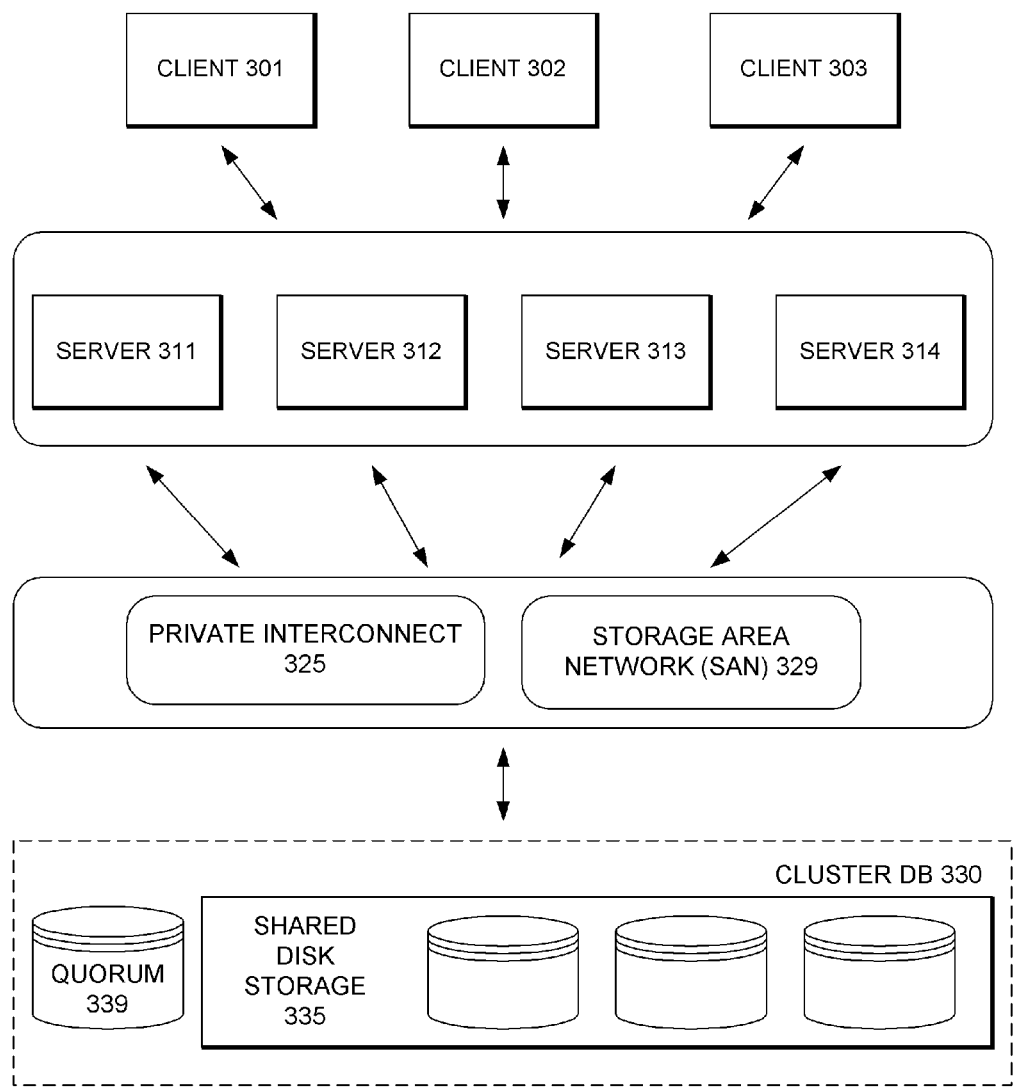
FIG. 3 is a high-level block diagram of a Shared Disk Cluster database system environment illustrating an example of a four node Shared Disk Cluster accessed by a plurality of clients.

FIG. 3 is a high-level block diagram of a Shared Disk Cluster database system environment 300 illustrating an example of a four node (servers 311, 312, 313, 314) Shared Disk Cluster accessed by a plurality of clients (clients 301, 302, 303). The term "cluster" refers to a collection of more than one networked (and usually homogeneous) nodes, which function as a single system. Each node generally contains its own CPU and memory resources. The term "clustered server" refers to a database server (currently implemented using Sybase® Adaptive Server® Enterprise ("ASE") available from assignee Sybase of Dublin, Calif.) which runs on a cluster (cluster DB 330) and jointly manages a single installation of the databases on the shared disk storage 335. As shown, the environment 300 also includes a quorum disk 339. The quorum disk 339 is a shared disk device used for cluster membership arbitration. The quorum disk also maintains a history of runtime cluster view changes.

A Shared Disk Cluster database system can be implemented using low cost "blade servers" such as Intel/Linux machines. In the presently preferred embodiment, nodes in the cluster communicate with each other through private interconnects (e.g., private interconnect 325). As shown at FIG. 3, the nodes are interconnected via redundant high-speed interconnects with each node also having a direct connection to all databases on a disk subsystem. Gigabit Ethernet and Infiniband may be used to provide these high-speed interconnects. The storage subsystem may be implemented using raw device support with a storage area network (SAN 329) or with file system support (e.g., through use of a clustered file system such as those from Veritas or Polyserv).

The above-described computer hardware and software are presented for purposes of illustrating the basic underlying desktop and server computer components that may be employed for implementing the present invention. For purposes of discussion, the following description will present examples in which it will be assumed that there exist multiple server instances (e.g., database servers) in a Shared Disk Cluster environment that communicate with one or more "clients" (e.g., personal computers or mobile devices). The present invention, however, is not limited to any particular environment or device configuration. Instead, the present invention may be implemented in any type of system architecture or processing environment capable of supporting the methodologies of the present invention presented in detail below.

Overview of System and Methodology for Multiple Heterogeneous Buffer Caches

Definition and Use of Global and Local Named Caches on Shared Disk Cluster

The present invention provides a memory management system and methodology which allows heterogeneous buffer caches to be created in a Shared Disk Cluster database system environment. The present invention allows instances in a Shared Disk Cluster environment to define and use named caches which may be configured locally on each instance to provide improved access to data frequently used by such instances. In its currently preferred embodiment, the present invention provides for two types of named caches which are referred to as "global" caches and "local" caches. The solution enables global caches to be defined to reside in every instance in the cluster, with such global caches typically having the same parameter settings and buffer pool settings on each instance. In addition, a local cache may be defined for some (or all) of the instances in the Shared Disk Cluster environment to more efficiently handle access to data objects at specific instance(s) in the cluster. If both global and local caches are defined for a particular instance, the local definition will override the global definition. In the currently preferred embodiment, instances which do not have a defined local cache use the global definition to create the cache.

The present invention allow applications to bind objects to named caches so as to provide more efficient data access and to reduce contention on the default data cache. In the currently preferred embodiment, a data object is bound to one named cache; either local or global. If the object is not bound to any cache it will use the default data cache. However, object binding information is provided on every instance in the cluster to aid in providing efficient access to data. The present invention also provides methodology for changing, displaying and monitoring the cache and buffer pools and for enabling users to configure named and global caches in the cluster to provide improved access to data (e.g., to match workload at each instance in the cluster).

With the present invention, users can deploy application partitioning to localize the application data on specific instance(s) of the cluster and reduce instance-to-instance cache page transfers, lock conflicts and meta data change synchronization. The named cache support provided by the present invention can be further exploited in this scenario to obtain improved performance. The varied workload and access pattern needs of different applications can be addressed by allowing them to have an instance specific cache configuration.

The solution provides users with the ability to define and configure multiple heterogeneous buffer caches to better meet the data access needs of applications running on different cluster instances. This approach gives users much desired flexibility to fine tune the cache properties and size on different cluster instances and provides named cache support in a Shared Disk Cluster environment. Moreover, the system and methodology of the present invention also provides for use of named caches to assist in instance recovery.

The architecture of the present invention takes into account logical cluster requirements and can support logical cluster configurations. With this approach every cache has a scope defining its domain. The domain can be all the instances (global) in the cluster or subset of instances in the cluster represented by a logical cluster. The cache will only reside in the instances which are part of the domain. The cache can be common or specific to the instances in the domain. As the scope or domain of the logical clusters increases or decreases by instances getting added or dropped, the caches which are defined for the logical clusters are also added or dropped implicitly.

Users can also use the system and methodology of the present invention to configure and use memory pools of various sizes in a cache. A user may, for example configure a named cache with larger-sized memory pools; enabling the user to take advantage of large contiguous I/Os for better performance. Applications that read large amounts of data sequentially, insert into tables without clustered indices or cause significant log write activity may benefit from such large I/O capabilities. Operations that allocate and initialize a large number of pages, such as create database may also benefit from these capabilities. For the global cache the size can be increased dynamically.

Usage of larger memory pools may result in improved performance over the performance of a Shared Disk Cluster system configured with memory pools of size SYBPAGESIZE only. SYBPAGESIZE is the page size specified in the boot command during the boot process. The buffer coherency manager (BCM) performance is measured in the context of the following assumptions. First, there is a general 80-20 rule which reflects that most of the time (e.g., approximately 80% of the time), in a properly partitioned cluster (application partition), the request for pages come from a single instance, while in a much smaller number of cases (e.g., approximately 20% of the time), the page might move to other instances. Thus, any memory management scheme that is designed should not compromise on the 80% case, while trying to optimize the 20% case. Second, Large MASS is used for I/O efficiency in a few conditions which include the following: (a) table scans or large-index scans; (b) sort; or (c) utilities like clustered index or DBCC. Characteristics of these usages are (i) mostly local to the instance; (ii) pages are not re-used; and (iii) while writes happen, higher-level locks prevent access to these pages from other instances. Page writes mostly happen locally in an instance, while sporadic writes (on a page) may occur at remote instances. Overall, the performance of a Shared Disk Cluster system can be improved if the applications are well partitioned. The definition and use of global and local caches to support the needs of applications on specific cluster instances will next be described.

Global Cache

A named cache which has a global definition and no local definition is termed a "global" cache. Global caches are created on all the instances of the Shared Disk Cluster system. In the presently preferred embodiment, global caches have only one entry in the system catalog table and all the instances read from this entry to create the cache on their respective instance. However, whenever the global cache is altered to be instance specific by defining a local settings change (e.g., size of the cache) for any instance, another separate entry is made for that instance as a local cache definition, uniquely identified by instance id. All the other instances which do not have a local definition use the global definition and instances which have local definition override the global settings with the local settings. For the global cache the size can be increased dynamically.

Local Cache

A "local" cache is a new extension to the concept of named caches provided by the present invention, which can be deployed in a Shared Disk Cluster environment to support application specific cache requirements. A local cache definition can be appended to override the global definition to have local settings specific to the instance. Caches can have global definition and local definition for some instances or have only local definitions.

Configurable Properties of Named Caches

A number of properties of named caches are user configurable to provide for improved efficiency and flexibility. In the currently preferred embodiment, the following are properties that can be instance specific:

Cache size: The size of the cache.

Cache state: "Default data cache", "Log only", "HK Ignore".

Cache replacement policy: Cache replacement policy can be "Strict LRU" or "Relaxed LRU".

Local cache partition number (number of cachelet): number of cache partitions can be different per instance (1|2|4|8|16|32|64) as can the number of memory pools and their sizes, wash size and local async prefetch limit.

In the currently preferred embodiment, whenever a local cache is defined the global pool configuration will be overridden automatically. The local cache should define its own pool configuration or the default pool configuration will be in effect. The local caches can be specified by a scope identifier, which serves as the domain. Scope can consist of a single instance or multiple instances in the cluster. More dimensions of the scope identifier are explained below.

Support of Logical Clusters

Logical clusters allow administrators to virtualize a set of resources within a physical cluster into multiple logical clusters that are available to different client domains. This allows a cluster to be partitioned among several applications, each with their own set of resources, service level agreements, and failover rules. The result is a system where different workloads can be safely brought together and independently managed. For environments where a single well partitioned application wishes to run across the cluster, logical clusters allow for effective routing of client connections to individual instances with client to instance affinity and full failover support. The present invention supports the use of logical clusters by providing support for cache configuration of logical clusters. In the currently preferred embodiment, the system supports the concept of scope and provides that the default scope is the entire cluster. When a logical cluster is defined, the scope can be changed to the logical cluster.

As part of supporting named caches for logical clusters, the present invention provides users with the ability to define a named cache for the logical cluster. In addition, new instances can be added and dropped from a logical cluster dynamically. With this dynamic add and drop capability, users can implicitly add and drop the cache for the logical cluster. The concept of global and local caches remains generally the same for a logical cluster as it is for an entire cluster which does not use the logical cluster concept. However the scope has one more dimension so that a cache defined with a logical cluster scope will only be present in the instances which are part of the logical cluster.

Configuration of Global and Local Caches in Shared Disk Cluster System

Figure 4:
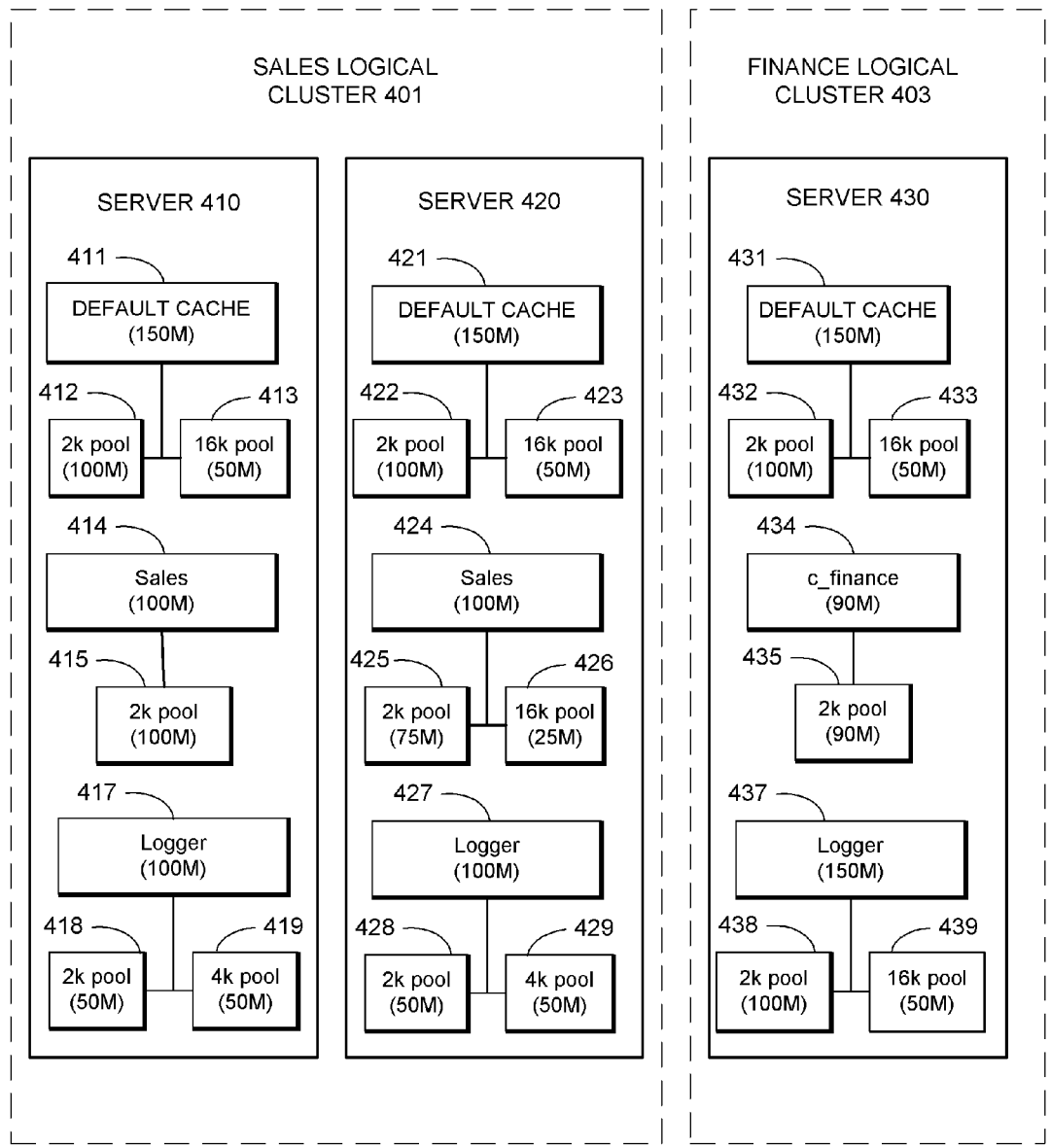
FIG. 4 is a block diagram of a Shared Disk Cluster system environment illustrating a sample configuration of global and local caches on instances of a cluster.

The configuration of global and local named caches may be illustrated by example. FIG. 4 is a block diagram of a Shared Disk Cluster system environment 400 illustrating a sample configuration of global and local named caches on instances in the cluster. As shown at FIG. 4, the Shared Disk Cluster system 400 comprises a three instance cluster including servers 410, 420, 430 which are divided into two logical clusters: a sales logical cluster 401 and a finance logical cluster 403. The sales logical cluster includes servers 410, 420 while the finance logical cluster includes server 430. In this example, the global and local cache definitions are as follows:

Global Cache Definitions:
Default Data Cache:
Attributes: (150M, "Default data cache", Strict LRU, 2 partitions)
Pool configurations: 2 k pool (100M), 16 k pool (50M)
Logger:
Attributes: (150M, "Log only", Strict LRU, 2 partition)
Pool configurations: 2 k pool (100M) 16 k pool (50M).
Local Cache Definitions:
Server 410, 420:
Logger Attributes: (100M, "Log only", Strict LRU, 2 partition)
Pool configurations: 2 k pool (50M) 4 k pool (50M)
Server 410: Sales:
Attributes: (100M, "mixed cache", Strict LRU, 2 partitions)
Pool configurations: 2 k pool (100M)
Server 420: Sales:
Attributes: (100M, "mixed cache", Strict LRU, 2 partitions)
Pool configurations: 2 k pool (75M) 16 k pool (25M)
Server 430: Finance:
Attributes: (90M, "mixed cache", Strict LRU, 4 partition)
Pool configurations: 2 k pool (90M)

As shown at FIG. 4, the default data cache is global and is present in all the instances as shown at 411 on Server 410, at 421 on Server 420 and at 431 on Server 430. In the currently preferred embodiment, the default data cache always has the entire cluster (e.g., all nodes of cluster 400) as its scope. Each of default caches 411, 412, 413 have 2K and 16K memory pool configurations as shown at 412, 413 on Server 410, at 422, 423 on Server 420 and at 432, 433 on Server 430.

The logger cache has both a global cache definition and a local cache definition. The scope of the global logger cache is the entire cluster. The defined scope of the local logger cache is the sales logical cluster (i.e., servers 410 and 420). As shown at FIG. 4, as there is no local logger cache definition for server 430, the global logger cache configuration (150M) is used on server 430 as shown at 437 and the 2 k and 16 k pool configuration as shown at 438, 439. However, on servers 410, 420, the definition of the local logger cache overrides global logger cache configuration. Thus, the local logger cache configuration created on server 410 is shown at 417, 418, 419 and has a different cache size (100M) and memory pool configuration (50M 2 k pool, 50M 4 k pool) than specified in the global definition. Similarly, at server 420 the local logger cache is shown at 427 and has the memory pool configuration shown at 428, 429.

The sales cache also has a local definition. The sales cache scope is the sales logical cluster 401. Server 410 and Server 420 are part of the sales logical cluster 401. The configuration of the local sales cache 414 on server 410 includes a 2 k pool (100M) as shown at 415 at FIG. 4. The memory pool configuration of the local sales cache 424 on server 420 includes both a 2 k pool and a 16 k pool as shown at 425, 426. Server 430 is part of the finance logical cluster 403. The scope of the finance logical cluster 403 is Server 430. A c_finance local cache is defined for server 430. As shown at FIG. 4, the c_finance cache 434 has a 2 k memory pool 435.

Multiple Buffer Pools

The same named cache can have different buffer pool configurations. Thus the pages for the same object bound to the named cache can reside in different size buffer pools in different instances. Therefore, depending upon the prefetch size indicated by the client, the appropriate pool size will be chosen. It should be noted that some of the pages requested from the pool can reside on other server instances in different size pools. With this situation one can have different cases in handling the transfer of pages between instances which are referred to below as "gathering" and "scattering".

Gathering: A client request processing instance may have the prefetch buffer pool size greater than the other instances who have one or many pages qualifying in the pool. The processing instance will then gather the pages from the other instances. Some of the pages may not be cached and hence will be read from disk.

Scattering: A client request processing instance may have the prefetch pool size less than another instance which has all the pages qualifying in the pool in a larger buffer pool. The requested pages will be transferred from the larger buffer pool on other instance to the processing instance in a smaller pool leading to the scattering of the pages into smaller buffer pools.

The appropriate buffer pool is chosen by the request processing instance and in cases where the request cannot be honored a buffer pool of SYBPAGESIZE is chosen in the currently preferred embodiment. However, from the view point of the client, there is no change in the pool configuration interface.

Recovery Using Named Caches

The present invention provides improved recovery capabilities by using named caches for rollback or abort of running transactions. This approach provides increased efficiency as the object binding change and the cache drop cannot succeed when objects are being accessed. The methodology of the present invention provides for introduction of a new type of online instance failure recovery. To facilitate the use of named caches for recovery, two different scenarios are handled. First, the cache id in the log record can be stale and the object can be bound to a different cache. In this case, one cannot use the cache id in the log record to cache the in-doubt page. Instead, the current cache binding information for the object is obtained. In the second scenario, the cache id in the log record may be stale and the cache may not exist (e.g., as can happen with logical clusters) or is set to size zero. In both cases, one needs to use the default data cache.

To address both of the above problems, the present invention provides for maintaining a mapping of object id to cache id in-memory on all instances. The recovery process can get the current cache id for an object through an API which will query this table. This API provides for finding the cache id for a given object id. If the cache does not exist, the cache id of default data cache will be returned. Recovery uses the API to obtain the current cache id for a given object and use that cache id for caching pages of that object.

Cluster Cache Configuration Management

The cache manager section of the configuration file has been modified to accommodate the concept of local caches. In a SMP environment, the following is a typical definition of a named cache.

1: [Named cache: default data cache]
2: cache size=100M
3: cache status=default data cache
4: replacement policy=DEFAULT
5: local cache partition number=4

As shown at line 1, the name of the cache is default data cache. The cache has a size 100M with cache status "default data cache", as shown at lines 2-3. As shown at line 4, the replacement policy is the DEFAULT policy which is "strict LRU replacement" in the currently preferred embodiment. The local cache partition number of 4 at line 5 suggests the creation of 4 partitions (cachelets) for the cache.

To implement methodology of the present invention, the above named cache definition is modified to have a scope specifier which currently has the following format:

1: [Named Cache: <name of the cache>]
2: [<scope>]
3: cache size=
4: cache status=
5: cache replacement policy=

The new scope specifier shown above at line 2 has the form [[instance name], [instance name], . . . ]. The cluster name defines the cluster, which can be physical cluster or logical cluster. The instance name is used to indicate the instance which is the part of the cluster. For instance, if one needs to have 100 M of default data cache in instance N1 and 200 M of the default data cache in instance N2 and instance N3 with different properties, the configuration (or config) file would look as follows:

1: [Named Cache: default data cache]
2: [Instance: N1]
3: cache size=100M
4: cache status=default data cache replacement policy=DEFAULT
5: local cache partition number=2
6: [Instance: N2]
7: cache size=200M
8: cache status=default data cache replacement policy=relaxed LRU replacement
9: local cache partition number=4
10: Cluster cache configuration
11: [Instance: N3]
12: cache size=200M
13: cache status=default data cache replacement policy=relaxed LRU replacement
14: local cache partition number=4
15: Cluster cache configuration If the scope is not mentioned then it applies to all the instances in the cluster. For example, one could have the named caches "Sales Cache" and "Finance Cache" in a cluster with two instances N1 and N2, with the "Sales Cache" in N1 and the "Finance Cache" in N2. In addition, one can also have "default data cache" for both instances with a size of 100M. In this case, the config file would look like the following:

1: [Named Cache: default data cache]
2: cache size=100M
3: cache status=default data cache replacement policy=DEFAULT
4: local cache partition number=4
5:
6: [Named Cache: Sales Cache]
7: [Instance: N1]
8: cache size=100M
9: cache status=mixed cache replacement policy=relaxed LRU replacement
10: local cache partition number=2
11:
12: [Named Cache: Finance Cache]
13: [Instance: N2]
14: cache size=200M
15: cache status=mixed cache replacement policy=strict LRU replacement
16: local cache partition number=DEFAULT In the above example, the default data cache is a global cache while the named Sales and Finance caches are local caches. It should be noted that local caches may or may not have global definition. In this case the Sales and Finance caches are examples of local caches without a global definition.

The following is the configuration file representation of the a portion of the cache configuration illustrated in FIG. 4 and described above in this specification:

1: [Named Cache: default data cache]
2: cache size=150M
3: cache status=default data cache
4: cache replacement policy=DEFAULT
5: local cache partition number=2
6:
7: [2K I/O Buffer Pool]
8: pool size=100M
9: wash size=4765 K
10: local async prefetch limit=DEFAULT
11:
12: [16K I/O Buffer Pool]
13: pool size=50M
14: wash size=2385 K
15: local async prefetch limit=DEFAULT
16:

17: [Named Cache: Sales]
18: [Instance: Server 410]
19: cache size=100M
20: cache status=mixed cache
21: cache replacement policy=DEFAULT
22: local cache partition number=2
23: [2K I/O Buffer Pool]
24: pool size=100M
25: wash size=4765 K
26: local async prefetch limit=DEFAULT
27: [Instance: Server 420]
28: cache size=100M
29: cache status=mixed cache
30: cache replacement policy=DEFAULT
31: local cache partition number=2
32:
33: [2K I/O Buffer Pool]
34: pool size=75M
35: wash size=3577 K
36: local async prefetch limit=DEFAULT
37: [16K I/O Buffer Pool]
38: pool size=25M
39: wash size=1192 K
40: local async prefetch limit=DEFAULT
41:
42: [Named Cache: Finance]
43: [Instance: Server 430]
44: cache size=90M
45: cache status=mixed cache
46: cache replacement policy=DEFAULT
47: local cache partition number=4
48: [2K I/O Buffer Pool]
49: pool size=90M
50: wash size=4765 K
51: local async prefetch limit=DEFAULT
52:
53: [Named Cache: Logger]
54: cache size=150M
55: cache status=log only
56: cache replacement policy=DEFAULT
57: local cache partition number=2
58:
59: [2K I/O Buffer Pool]
60: pool size=100M
61: wash size=4765 K
62: local async prefetch limit=DEFAULT
63:
64: [16K I/O Buffer Pool]
65: pool size=50M
66: wash size=2385 K
67: local async prefetch limit=DEFAULT
68:
69: [Instance: Server 410]
70: cache size=100M
71:
72: [2K I/O Buffer Pool]
73: pool size=50M
74: wash size=2385 K
75: local async prefetch limit=DEFAULT
76:
77: [4K I/O Buffer Pool]
78: pool size=50M
79: wash size=2385 K
80: local async prefetch limit=DEFAULT
81:
82: [Instance: Server 430]
83: cache size=100M
84:
85: [2K I/O Buffer Pool]
86: pool size=50M
87: wash size=2385 K
88: local async prefetch limit=DEFAULT
89:
90: [4K I/O Buffer Pool]
91: pool size=50M
92: wash size=2385 K
93: local async prefetch limit=DEFAULT It should be noted that the terms "server 410" "server 420" are used for purposes of the above example so as to correspond to FIG. 4. However in typical operation cluster instances would be identified in a different fashion.

In addition to the above, one can also have both a global and local cache definition. For example, a cache which is named "temp_cache" can have global size of 200M and on a specific instance N1 can have a local cache definition setting its size to 100M. In this example, the configuration file would be as illustrated below:

1: [Named Cache: temp cache]
2: cache size=200M
3: cache status=mixed cache replacement policy=relaxed LRU replacement
4: local cache partition number=2
5:
6: [Instance: N1]
7: cache size=100M
8: cache replacement policy=strict LRU replacement
9: local cache partition number=DEFAULT If any cache specific information is not present in the local scope then it is taken from the global scope. For instance, assume the same example shown above, however the cache size of temp_cache in N1 is 100M and all other parameters are similar to that of the global cache. In this case, the configuration file will have the following entries:

1: [Named Cache: temp cache]
2: cache size=200M
3: cache status=mixed cache replacement policy=relaxed LRU replacement
4: local cache partition number=2
5: [Instance: N1]
6: cache size=100M In the above case instance N1 has all attributes other than size as defined in the global definition. However, the size is 100M as provided in the local section as the local definition of cache size overrides the global definition for instance N1.

Information Reporting Functionality and Error Recovery

The present invention, in its currently preferred embodiment, also provides stored procedures which can be used to display, monitor and change cluster cache configurations. In addition, error handling enhancements are provided to handle cases where a change in cache configurations in the SDC needs to be propagated to other instances in the cluster and a failure to update occurs at one (or more) of the instances. In this event, the error handling procedure generally provides for the cache configurations in all instances in the SDC which are involved to revert the changes made by the command.

Monitor Server Events and Counters

A counter is introduced to indicate the number of times an object had to switch to the default data cache as a result of the size of the cache to which the object was bound being set to zero. A new counter is also provided to indicate the number of times an object had to switch to the default data cache as a result of the cache to which the object was bound not existing (currently, this can happen in case of logical clusters). Monitor counters are also provided for transfer of pages from a large pool to a small pool and vice-versa.

System Stored Procedures

Implementation of cluster cache configuration methodology of the present invention also includes changes and additions to stored procedures. One change is that "<scope: cache_ name>" is used in place of "cache_name". Stored procedures provided in the presently preferred embodiment include those described in the following discussion.

1. sp_cacheconfig: This procedure creates, drops or modifies named caches. Currently, creating, dropping, enlarging and changing the cache type is dynamic, however to reduce the cache, the cache needs to be dropped and recreated. When only cache name is specified then the status of that cache is displayed. Without any cache name the status of all the caches is displayed. The present invention adds the above-described scope variable. This enables only the cache configurations of a particular scope to be displayed when the scope is specified. If no scope is specified, the cache configuration of the cluster (i.e., the entire SDC) is displayed. The format of the display is also updated for consistency. If the named cache is specified to change the properties of the cache already created and if it is a global cache, the scope of the cache need not be specified. When the size of the cache is set to zero, the cache is not dropped. Whichever instance provides for execution of the command also make changes to the sys-configures table and asks other instances to read it and make changes accordingly. In failure circumstances, the changes can be reverted. The syntax of this stored procedure is as follows:

SYNTAX: sp_cacheconfig[cachename[,"cache_size [P|K|M|G]"]
[,logonly|mixed][,strict|relaxed]]
[,"cache_partition=[1|2|4|8|16|32|64]"]
[,'instance<separated instancename>']

The following are illustrative examples.

To set Sales Cache on NODE1 to 100M:

sp_cacheconfig 'NODE1: Sales Cache', '100M'

Here the local Sales cache on instance NODE1 will be changed with the message: "Named cache 'Sales Cache' local settings for NODE1 changed". If NODE1 is not specified then the global settings will be changed with the additional message: "Named cache 'Sales Cache' global settings changed".

To drop Finance named cache from instances NODE1 and NODE2:

sp_cacheconfig 'NODE1, NODE2: Finance','0'

To display the cache configuration for the complete cluster, sp_cacheconfig is used without any arguments as follows:

sp_cacheconfig 2. sp_poolconfig: This procedure creates, drops or modifies buffer pools for a specified named cache. When only the named cache is specified the status of the buffer pools in the named cache is displayed. For implementing the present invention in the SDC environment, enhancements were made to the procedure to add support for the scope variable for the cache name. This enables the display of different buffer pool settings for a given cache on all the instances. The syntax is as follows:

SYNTAX: sp_poolconfig cache_name[,'size P|K|M|G', 'pool_id'[,'affected_pool_id']][, 'instance<separated instancename'}]

For example, the following may be used in order to create a 16 k pool of size 25M in default data cache on instance NODE2:

sp_poolconfig 'NODE2: default data cache', '25M', '16K'

As another example, the following may be used to display the pool configuration in the default data cache on instance NODE2:

sp_poolconfig NODE2: default data cache

To display the pool configuration for a named cache "c_log" on all the instances of the cluster, the following may be utilized:

sp_poolconfig c_log 3. sp_bindcache: This stored procedure binds an object to the specified named cache. If the object is bound to a different cache, then the object is rebound to the new cache. The object can be database, table, index or a table's text or image column. For implementation on the SDC, binding change information needs to be propagated to all the instances and access to that object on all the instances needs to be blocked until the binding change information is put into sys-attributes and all the instances have flushed the pages belonging to that object. As discussed below in this document, the cache id is unique throughout the cluster and when an object is bound to a cache this information is replicated on all instances and is used on all instances irrespective of whether the cache exists. In the event the cache id does not exist then the default data cache is used. Hence, one need not have an instance name specifier for the cache name.

4. sp_helpcache: Displays cache binding for a specified cache. Without a cache name specified, it will display binding for all caches. When size is specified the overload on that size is computed. If the cache name is specified along with size and if the cache has cluster or logical subset scope then the overload on that size on all the instances, which are part of the scope, is computed. If scope variable is provided, cache binding info for a particular scope and particular cache is found. If the scope is not specified then the overhead is computed for all instances where the cache is active. The syntax of the procedure is as follows:

SYNTAX: sp_helpcache cache_name[,'instance<separated instancename>']

To display the cache configurations and binding info for all the caches in the cluster, sp_helpcache may be used without any parameters. The following can be used to display the overhead for the cache NODE2 C2 on size 10M:

sp_helpcache 'NODE2: C2', '10M'

5. sp_unbindcache: Unbinds an object specified from its current cache binding. Binding change information needs to be propagated to all the instances and access to that object on all the instances needs to be blocked until the binding change information is put into sysattributes and all the instances have flushed the pages belonging to that object.

SYNTAX: sp_unbindcache db_name[, table_name[, index_name|'text only']]

6. sp_unbindcache_all: Unbinds all objects bound to a specified cache.

SYNTAX: sp_unbindcache_all cache_name 7. sp_cachestrategy: Enables or disables large I/O ('prefetch') or MRU buffer replacement. By default it is enabled. The value is propagated to all the instances in the cluster.

SYNTAX: sp_cachestrategy db_name, table_name[, index_name|'text only'|'table only'[,'prefetch'|'mru', 'on'|'off']]

8. sp_configure: For sp_configure parameters affecting the cache are considered. The global cache partition number is important as it is used for defining the default number of cache partitions for all named caches which have not been individually configured. Configuration changes are propagated to all the instances in the cluster.

SYNTAX: sp_configure 'global cache partition number', {1|2|4|8|16|32|64}

The following can be used to get the data cache size from all the instances.

SYNTAX: sp_configure 'total data cache size'

System Table Changes

The system catalog sysconfigures is modified to implement methodology of the present invention. In cache definition and pool definition the cache name has two more additional columns. One column is for the cluster id and the other column is for the instance id.

Performance Characteristics

One of the assumptions made is that a transfer of a page across instances in a cluster is faster than a read of the same page from disk notwithstanding the messaging that is involved in the process. However, frequent transfer of pages across instances in a cluster may still cause a performance bottleneck as messages need to be sent back and forth to set up a page transfer before the transfer itself is actually started. However, page transfers are generally at a manageable level as requests for a page originate mostly at a single instance and remote requests are much less frequent. In other words when applications are well partitioned and ones having similar access patterns directed to specific nodes, the performance of the system is improved. When requests for a page originate from a single node, even the locking mechanism will save on messages since the node will retain a lock once granted to it as long as a conflicting request is not seen. Allowing some leeway, as long as the previously mentioned 80-20 rule can be applied (i.e., approximately 80% of the time a page is requested by a single instance in a cluster with only about 20% of the requests coming from other instances in the cluster), performance is acceptable. The performance characteristics might differ if a logical cluster has more than one instance as the 80-20 rule for instances cannot be directly applied to two instances within a logical cluster. If the application partitioning (and hence the page access) is based on a logical cluster, and all the instances within the logical cluster are equally likely to access a page, performance may be adversely affected. Messaging cannot be avoided within the instances in a logical cluster and frequent page transfers among such instances might slow the system down. A directing mechanism can be employed within a logical cluster to ensure that in the majority of cases access of a page takes place at one instance.

Potential Failure Conditions

During the setup and configuration of multiple caches, failure conditions are limited and the failure points mostly relate to sysattributes failures of resource shortages. Changing the configuration through sp_cacheconfig or sp_poolconfig procedures require the change to be propagated to other instances in the cluster. In the event of failure to propagate this information, exception handling is provided so that changes made to the catalog and in-memory structures on all the other instances running can be reverted to undo the operation. Presently, all configuration changes are atomic in nature. They take place or are undone if there was failure in applying the change to all the instances in the cluster.

For takeover functionality, the surviving instance generally uses the default data cache for all data objects which are not bound to any named cache in the surviving instance. However, if the object is bound to any named cache in this instance, then the corresponding cache will be used as described below in greater detail.

Alternative Approach

An alternative approach which was considered was allowing the same object to be bound to different cache ids on a per instance basis. However, this alternative approach was rejected as it would involve increased complexity in administration and in design.

A general multi-configuration strategy was also considered. In design of the present invention, two ways of implementation of the multi-configuration strategy were considered. The first is to allow users to declare multiple configurations and the instances configured in the cluster can use any of the particular configurations. Thus, with this approach there can be two or more instances sharing the same configuration. Advantages of this approach of multiple instances sharing the same configurations include that one can have a logical subset of the cluster having the same configuration and serving the same family of applications. Also, this would typically result in a lesser number of configurations to maintain. In addition, object binding would remain same in the instances sharing the configurations and thus failover processing would be easier and more efficient. However, disadvantages include that as multiple instances can share same configuration, changes made to the configuration by one instance need to be propagated to all instances sharing the configuration. This would require modification of sp_cacheconfig, sp_poolconfig and other stored procedures. In addition, each instance whose configuration is shared by one or more instances would need to have the information of these instances, which would require additional book keeping. It would also be difficult to customize the cache configuration based on the workload on a specific instance. Each instance would need to have similar workload as they would share the configuration file.

The approach used in the present invention is to instead allow a different cache configuration for every instance in the cluster. Thus every instance can have its own cache configuration. Advantages of this approach include that each instance can have its own configuration, without worrying about the other instances. Thus, the memory hardware on each instance can be different and the configuration can be tuned in such a way to take maximum benefit of it. Also, the approach enables one to uniquely determine which instance is using the particular cache and thus is better able to enforce the cache binding directives. In addition, complexity is reduced as there is no need to clusterize all of the stored procedures for cache configuration and pool configuration. However, some stored procedures have been modified to work in the cluster environment, including those described above. Implementation of the present invention in which each instance can have a different cache configuration does require use of more space in the configuration file as configurations for each instance need to be explicitly mentioned in the configuration file. However, this is a minor drawback compared to the benefit of giving each instance more flexibility, extensibility and less complexity in configuring its own cache.

As cache configuration is on a per instance basis, in the presently preferred embodiment every instance configuration is stored in the sysconfigures table. The pool and memory configuration of default data cache can also be different per instance. The number of named caches used and the total memory deployed by each instance for data and log page caching can also be configured distinctly. These features provide database administrators more flexibility to adapt the memory configuration on the cluster to the requirements of the applications using the cluster. The methodology of the present invention for creation of global and local caches and accessing objects held in cache will next be described.

Detailed Operation

Methodology for Accessing Selected Data Objects

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

In existing SMP system environments, when deciding the cache for an object, the object to cache binding information is typically read from a system attributes (sysattributes) catalog. This binding is then typically stored in session descriptor structure and is used every time the object is accessed. With the present invention, this approach is modified and improved for a distributed system environment (e.g., SDC system environment). With the cluster cache configuration system and methodology of the present invention, the cache id is unique throughout the cluster and when object is bound to one cache id then it will use the same cache id on all the instances (whether the cache exists or does not exist on each instance). In the event that the cache does not exist on a given instance, the default data cache is used on that instance. The object to cache binding information is stored in an in-memory mapping structure along with kernel data structure. This object to cache binding information may, for example, be consulted when a page is being transferred from one node to another node. Another example in which the binding structure is consulted is during recovery.

The in-memory mapping structure including the cache binding information is replicated on all the instances of the cluster. The in-memory structure stores binding information for all the caches irrespective of whether such caches exist on a particular instance. This same methodology is used for normal access, online instance recovery and failed instance takeover. Whenever there is a request coming in an instance for an operation on any data object, a check is made to determine if the data object is bound to any cache (i.e., a named cache as described above) in this instance. If the object is bound to one of the named caches that exists in this instance, that corresponding named cache is used. Otherwise, if the object is not bound to any named cache in this instance, the default data cache is used. This same approach is also utilized in a failover scenario.

Figure 5:
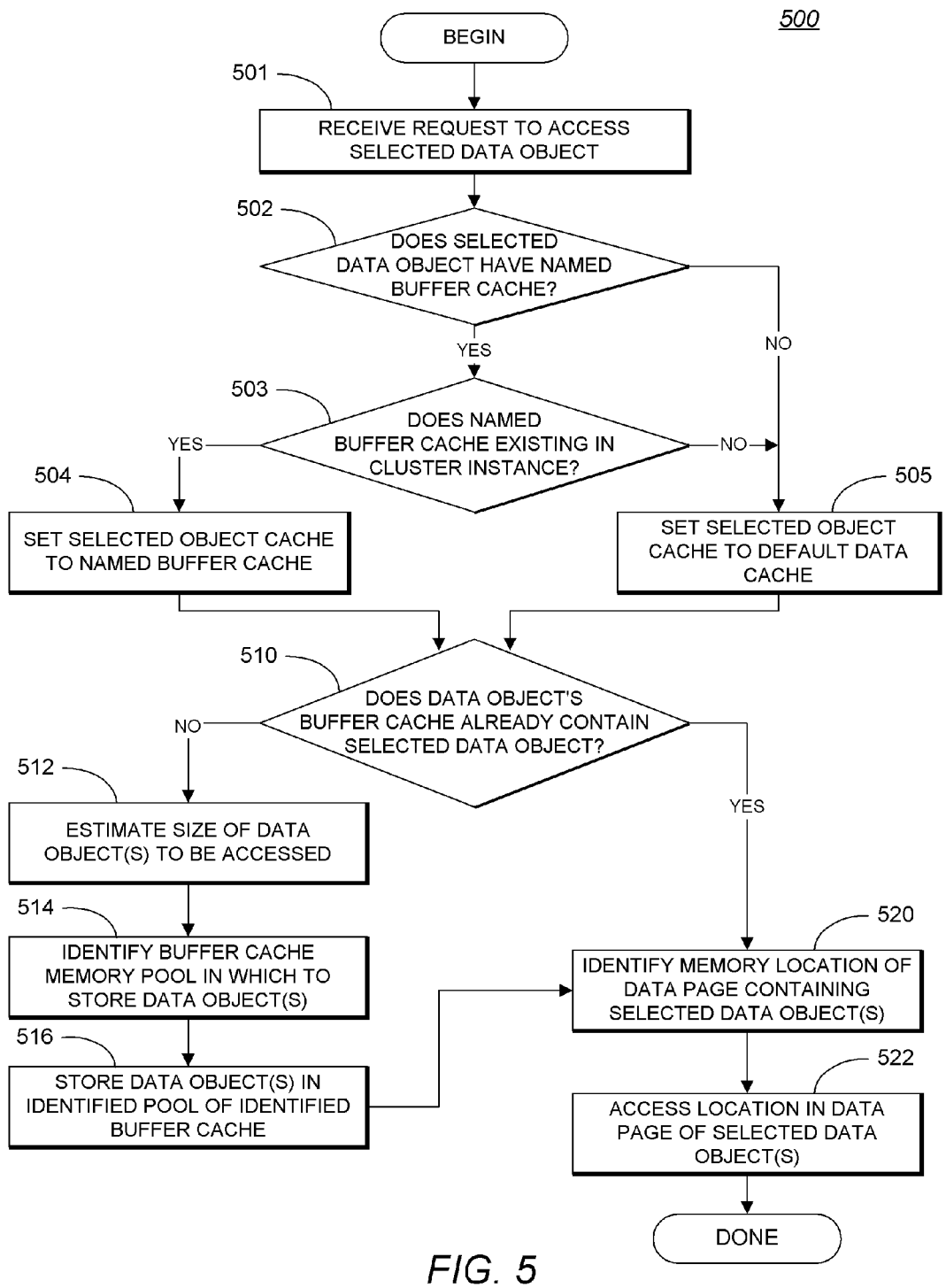
FIG. 5 presents a process flow diagram illustrating the methodology of the present invention for accessing a selected data object.

FIG. 5 presents a process flow diagram 500 illustrating the methodology of the present invention for accessing a selected data object in further detail. The process begins at 501 with the system receiving a request to access a selected data object. This request may, of course, come from various sources. For example, in a preferred embodiment the method may be initiated when a query requiring access to at least one data object is received.

In response to the request, a decision step 502 determines whether the selected data object has (i.e., is bound to) a named buffer cache (i.e., a local or global named cache). As noted, this step may be accomplished by consulting the above-referenced binding structure which indicates whether the data object is bound to any specific buffer cache.

If step 502 determines that the data object does, in fact, have to a named buffer cache, the method proceeds to step 503. However, if step 502 determines that the data object does not have a named buffer cache, step 505 sets the data object's buffer cache to the default data cache. On the other hand, if the object has a named data cache at step 502, at step 503 a determination is made as to whether the named buffer cache (e.g., identified by a particular cache id) exists in the current cluster instance. The determination is made by consulting the above-described binding structure to determine if the named buffer cache exists in this cluster instance. A particular named cache may, for example, be defined on an another node (i.e., another instance) in the cluster and not on this local cluster instance.

If the named buffer cache does not exist in the cluster instance (i.e., the decision at 503 is negative), the data object's cache is set to the default data cache at step 505. Otherwise, if the named buffer cache does exist in the cluster instance, the selected object cache is set to the named buffer cache at step 504. It should be noted that there are several situations which are addressed through this methodology. Some of these situations involve consulting the binding structure for a given cache id while others involve consulting the structure for a given object id. For example, in a case involving recovery, the binding structure is consulted to determine the current binding for a particular object (e.g., identified by object id). The object made, for example, be a particular table. If the table does not have any particular binding, then the default data cache is used as provided at step 505. However, if it has a binding available, then it uses that binding at provided at step 504.

In any event, a decision step 510 next determines whether the identified buffer cache (i.e., the named buffer cache or the default data cache as applicable) already contains the selected data object. The data object may be stored in cache because, for example, it had been copied during an earlier transaction. This step is necessary to prevent the system from copying from the disks when the desired data is already in cache. The system may consult an index for determining whether a buffer cache contains the selected data object. Indexes are generally used with databases to quickly determine where particular objects are located. For example, an access methods system element may consult an index to identify a page number on which the data object is stored. Once the page number on which the data object is stored is identified, a determination is made as to whether the data object having the identified page number is stored in the buffer cache.

If the data object is not already in cache, it is loaded into the appropriate buffer cache before further processing. A three step process including steps 512, 514, and 516 is employed to load a data object into a buffer cache. Thus, if the question proposed in decision step 510 is answered in negative, the process proceeds to step 512 where the system estimates the size of the data object(s) to be accessed. This estimated size may include the selected data object as well as other data objects (e.g., other data objects on the same page). The system estimates the size so as to determine which memory pool (assuming the selected buffer cache has more than one) will be utilized most efficiently when accessing the data. To do so, the system first estimates the size of the data object(s) that is to be read into memory. A variety of methods may be used to estimate the size of the data object(s). For example, it may involve determining the row size of a table that is to be read into the cache.

Next, step 514 identifies the buffer cache memory pool in which to store the data object(s). Of course, if the buffer cache contains only a single memory pool, step 514 is not pertinent. Assuming that the cache contains multiple memory pools of different sizes, the system will select a memory pool of appropriate size based on the estimated size of the data to be read into memory in a single operation. For example, if the data that is to be read into memory is about 2 k (i.e., the size of a typical page of data) a smaller memory pool (e.g., 2 k pool) will typically be used to avoid wasting large amounts of buffer space. On the other hand, the data object is copied to a larger memory pool if the estimated size of the data object(s) to be transferred is large. At step 516, the selected data object is stored in the pool identified in step 514 of the identified buffer cache.

Thereafter, at step 520 the system identifies the memory location of the data page containing the selected data object. This page is then accessed to obtain the selected data object in a step 522. The process is then completed. If decision step 510 determines that the buffer cache already contains the selected data object, the loading steps 512, 514, and 516 are not performed, and the process proceeds directly to step 520 and then 522 as shown at FIG. 5.

The following illustrates a method provided in the presently preferred embodiment for consulting the cache binding information to determine whether a selected object is bound to a named cache:

```
 1: CACHE_BINDING *
 2: cm_attr_get_cached_binding(dbid_t dbid, objid_t objid, indid_t
    indid)
 3: {
 4:    CACHE_BINDING *binding, *db_binding;
 5:
 6:    db_binding = NULL;
 7:
 8:    if (Resource->rcache_bindings == (CACHE_BINDING *)NULL)
 9:    {
10:       /* Nothing to do */
11:       return NULL;
12:    }
13:
14:    P_SPINLOCK(CACHE_ATTR_SPIN);
15:
16:    binding = Resource->rcache_bindings;
17:    while (binding != (CACHE_BINDING *)NULL)
18:    {
19:       if (binding->dbid == dbid)
20:       {
21:          /*
22:          ** Objid =0, indid = 0 indicates db binding.
23:          ** Remember this binding in case there is
24:          ** no exact match.
25:          */
26:          if ((binding->objid == 0) &&
27:             (binding->indid == 0))
28:          {
29:             db_binding = binding;
30:          }
31:
32:          if (objid == CM_ATTR_INVALID)
33:          {
34:             V_SPINLOCK(CACHE_ATTR_SPIN);
35:             return(binding);
36:          }
37:
38:          if ((binding->objid == objid) &&
39:             (binding->indid == indid))
40:          {
41:             V_SPINLOCK(CACHE_ATTR_SPIN);
42:             return(binding);
43:          }
44:       }
45:       binding = binding->next;
46:    }
47:
48:    V_SPINLOCK(CACHE_ATTR_SPIN);
49:
50:    /*
51:    ** If we get to this point, there wasn't an exact match.
52:    ** Return the db binding if it exists.
53:    */
54:    return(db_binding);
55: }
```

The binding of objects to named caches will next be described.

Strategy for Binding Objects to Cache

When new caches are created at an instance, they obtain a unique cache id across the cluster as they make entries in the sysconfigures table. Every cache id also has an instance id attached, which indicates for which instance the cache is added. By default, objects use the default data cache and all the objects not bound to any named cache in a particular instance will use the default data cache. Users can selectively bind objects to different named caches in an instance. Objects can also be bound to different caches, provided these caches are in different instances. This assists administrators wanting to distribute the failover instance objects in the surviving instance. Every instance has a different set of binding information cached, which is specific for that instance.

There are alternative ways one can implement system table changes to maintain the instance specific cache configuration information. One approach is to change the cache id from a 16-bit field to a 32-bit field and have the higher 8 bits for the instance id. This approach also requires change to sysconfigures and sysattributes which store 16-bit cache id column. Another approach is that as the cache id is unique over the cluster, a 16-bit instance id column can be added to the sysconfigures table. Whenever a new binding is created, the cache id is obtained from the sysattributes table and is validated with the instance id from the sysconfigures table to make sure multiple objects are not bound to the caches in the same instance.

The instance specific configuration is currently defined in the following way in the configuration file:

1: [Named Cache:<Instance name>.<Cache name>]
2: cache size=<?>
3: cache status=<?>
4: cache replacement policy=<?>
5: local cache partition number=<?>

The Instance name is the name of the instance in the cluster which is specified in the interfaces file. The Cache name is the name of the cache. Other aspects of the configuration file remain the same.

Cache Structures

Every cache encountered in the system cache configuration (SYSCACHECONFIG) table will be described by a cache descriptor. The following structure defines a descriptor for a cache:

```
 1: typedef struct cache_desc
 2: {
 3:    struct spinlock *cspin;          /* spinlock for cache */
 4:    BUF           **cbufhash;        /* hash table for cache */
 5:    c m_hash_func_t chash_func;      /* hash function for cache */
 6:    cm_victim_func_t  cvictim_func;  /* replacement function */
 7:    uint16         ccachestatus;     /* status of this cache:
 8:                                       CM_DEFAULT_CACHE,
 9:                                       CM_MIXED_CACHE, or
10:                                       CM_LOG_ONLY, or
11:                                       CM_CACHE_CFG_UPD
12:                                       CM_HK_IGNORE,
13:                                       CM_CLOCK or
14:                                       CM_LRU */
15:    SYB_BOOLEAN    cactive;          /* flag to find cache is
16:                                       ** active or not
```

-continued

```
17:                                */
18:    cacheid_t cid;               /* id of a cache */
19:    cacheletid_t cletid;         /* id of a cachelet
within a
20:                                 cache */
21:    int32    clog2cachelets;     /* log2(number of
cachelets)*/
22:    int32    cnum_buf_slots;    /* (# hash buckets -
1) */
23:    cluster_factor_t cext_cluster_mask;    /* mask to cluster
hash on
24:                                 extents */
25:    int32    cnumcachelets;     /* the number of
cachelet aka
26:                                 cache partition
defined on
27:                                 this cache */
28:    int32    cavail_pools;      /* bitmask - sizes of
pools
29:                                 configured */
30:    int32    cmin_mass_size;    /* smallest mass
configured
31:                                 for cache */
32:    int32    cbufreserves;      /* # bufs reserved
from the
33:    cache */
34:    unsigned long  ctotalcachesize;    /* total size of
cache (in K)*/
35:    int32    coverhead;         /* overhead of cache
(in K) */
36:    struct cache_chunk cbuf_chunk[MAXMEMMAP];/* Start and
end addresses
37:                                 or buffer
structures. */
38:    struct cache_chunk cpage_chunk[MAXMEMMAP];/* Start and
end addresses
39:                                 of pages. */
40:    int32    csemaphore;        /* claimcache( ) uses
for
41:                                 sleeping */
42:    int32    ctransit_lock;     /* lock to single
thread
43:                                 dynamic buffer pool
44:                                  movement */
45:
46:    struct buf_pool_desc  *cpools[MAX_BUFPOOLS]; /* buffer
pools */
47:    char    cvaluestr[MAXSIZESTR]; /* string in config
file
48:                                 ** for size of cache.
49:                                 */
50:    char    cname[MAX_NAME+1];  /* name of cache */
51:    int32    clen;              /* length of name */
52:    int16    curr_cbuf_chunk_slot; /* index into
cbuf_chunk */
53:    int16    curr_cpage_chunK_slot; /* index into
cpage_chunk */
54:    struct lockstatq *clockstatq;    /* Queue used for the
55:                                 ** lock physical
calls.
56:                                 */
```

One interesting thing to note in the above cache descriptor (cache_desc) structure is the array of buf_pool_desc as shown above at line 46. Every element in this array denotes a memory (buffer) pool of a certain size. As previously described, a cache may have multiple memory pools of different sizes.

The following fields are maintained for static options. When, for example, a user issues a sp_cacheconfig stored procedure to change the cache configuration, a cache descriptor is built based on information in the sysconfigures table and is passed to the driver function cfg_updatecache( ). When a static option is changed for the first time the function issues a warning message to the user, and saves the most recent value in the variables below. The next time the function is invoked, the values in the cache descriptor built from sysconfigures are compared with these saved values so that messages are not re-issued.

```
1:     cacheletid_t sav_nclets;        /* Last changed
number of
2:                                     ** cachelets */
3:     uint16    sav_ccachestatus;    /* Last changed cache
4:                                     ** status */
5:     unsigned long sav_ctotalcachesize;   /* Last changed cache
6:                                     ** size. */
7:                                     /* Starting location
of
8:                                     ** monitor counters
for each
9:                                     ** engine and sample
monitor */
10:    moncount_t  *mon_cache_ctrs[MAXENGINES + 1];
11:    BYTE        *mon_ctrs_start_addr; /* memory address
returned by
12:                                     ** fragment pool
manager
13:                                     ** before
14:                                     ** adjustment */
15: #if LARGE_MEMORY
16:    int32      user_cfg_wash_size; /* actual user
configured value */
17: #endif /* LARGE_MEMORY */
18:    unsigned cdmamemhdl;            /* Memory handle to be
19:                                     ** used by the CIPC
20:                                     ** layer.
21:                                     */
22: #if USE_CLUSTER
23:    char    cinstancename[MAXSERVNAME];   /* If the cinstanceid
is 0 the
24:                                     ** the cache is
global cache
25:                                     ** else it is local
cache specific
26:                                     ** to some instance.
27:                                     */
28: #endif /* USE_CLUSTER */
29: } CACHE_DESC;
```

As shown above at line 23, the above structure uses the variable cinstancename indicating the instance in which the cache exists.

The following includes new pool_config and cache_config structures provided for implementation of the cluster cache configuration methodology of the present invention:

```
1: #if USE_CLUSTER
2:    /* Cache Partial status flags - 16 bits */
3:    #define DEF_CACHE_STATUS      0x1 /* cache status */
4:    #define DEF_CACHE_SIZE        0x2 /* cache size */
5:    #define DEF_CACHE_LRU         0x4 /* cache lru policy */
6:    #define DEF_CACHE_PARTITION   0x8 /* cache partition */
7:    #define DEF_CACHE_FOUND       0x10 /* cache definition
8:                                    ** found in sysconfigures
9:                                    */
10:
11:   /* Pool Partial status flags - 16 bits */
12:   #define CFG_DEF_2K       0x1 /* 2k pool */
13:   #define CFG_DEF_4K       0x2 /* 4k pool */
14:   #define CFG_DEF_8K       0x4 /* 8k pool */
15:   #define CFG_DEF_16K      0x8 /* 16k pool */
16:   #define DEF_POOL_SIZE    0x10 /* pool size */
17:   #define DEF_POOL_WASH_SIZE    0x20 /* wash size */
18:   #define DEF_POOL_PREFETCH     0x40 /* prefetch limit */
19:   #define CFG_DEF_32K      0x80 /* 32K pool */
20:   #define CFG_DEF_64K      0x100 /* 64K pool */
21:   #define CFG_DEF_128K     0x200 /* 128K pool */
22:   #define CFG_DEF_256K     0x400 /* 256K pool */
23:   #define CFG_DEF_512K     0x800 /* 512K pool */
```

-continued

```
24: #define DEF_POOL_FOUND    0x1000 /* pool definition found
25:                                  ** in sysconfigures
26:                                  */
27:
28:
29:
30: typedef struct pool_config
31: {
32:   char pool_instance[MAXSYBSVRNAME]; /* Instance name */
33:   char pool_size[MAXCTEXT];    /* pool size */
34:   char wash_size[MAXSYBSVRNAME];   /* wash_size */
35:   char prefetch[MAXSYBSVRNAME];   /* prefetch limit */
36:   uint16 pool_status;          /* Status of the cache
37:                                  ** defined
38:                                  */
39: }POOL_CONFIG;
40:
41: typedef struct cache_config
42: {
43:   char cache_instance[MAXSYBSVRNAME]; /* Instance name */
44:   char name[MAX_NAME];        /* cache name */
45:   uint32 status;              /* cache status */
46:   char cache_size[MAXCTEXT];  /* cache size */
47:   char lru_policy[MAXSYBSVRNAME]; /* cache lru policy */
48:   char partition[MAXSYBSVRNAME]; /* partition number */
49:   uint16 cache_status;        /* Status of the cache
50:                                 ** defined
51:                                 */
52:   POOL_CONFIG **pool_config;  /* Pool array */
53:   uint16 pooldefnum;          /* number of pool
definitions */
54: }CACHE_CONFIG;
55:
56: #endif /* USE_CLUSTER */
57:
58: typedef struct cfg_head
59: {
60:   uint32      cfgstatus;       /* current status of
config */
61:   int32       cfgerrstatus;    /* error status of
config */
62:   char        cfgfilename[MAX_CFGNAME];/* current config
file name */
63:   INTL_LOCFILE  *cfgfile;      /* pointer to config
file */
64:   struct ds_config *cfgdata;   /* pointer to config
data */
65:   struct cache_desc **cfgcache; /* pointer to cache
des array */
66:   int32 cfgcachenum;           /* cache counter
during config*/
67:   struct cache_desc **cfg_rec_cache;  /* pointer to cache
des array
68:                                ** that will be used
only by
69:                                ** recovery to store
original
70:                                ** cache
configurations before
71:                                ** recovery tunes the
cache.
72:                                */
73: #if USE_CLUSTER
74:   CACHE_CONFIG **cfgremotedef;  /* Stores the cache
definitions
75:                                ** which are not for
this instance
76:                                ** and required while
writing the
77:                                ** config file
78:                                */
79:   int32       cfgdefnum;       /* number of cache
definitions
80:                                ** in cfgremotedef
array.
81:                                */
82: #endif /* USE_CLUSTER */
83:   int32       cfgtotalcachelets;  /* total cachelets
counter */
84:   struct cfg_mem_used *cfgmemory_used; /* pointer to memory
data */
85:   CFG_EXTRAS   cfgextras;      /* extra
configuration data */
86:                                /* that won't fit in
ds_config*/
87:   uint32      cfgstatus2;      /* few more bits for
cfghead */
88:   int32       cfg_bitmapsize;  /* size of bitmap to
map
89:                                ** server memory.
90:                                */
91:   size_t      *cfg_dyndef_total; /* array of dynmp
deficits */
92:   size_t      cfg_datacache_deficit; /* Data cache deficit
in
93:                                ** KiloBytes.
94:                                */
95:   BITMAP(cfgmap, MAXCFGBIT);   /* bitmap for cfg
options */
96: } CFG_HEAD;
```

The above cache_config and pool_config structures are used to read the cache configuration and pool configuration, respectively, from the configuration file. The structures hang from the above CFG_HEAD structure.

The following cache_binding structure is the structure which is used to store the cache binding information:

```
1:  typedef struct cache_binding
2:  {
3:       cacheid_t     cid;
4:       objid_t       objid;
5:       indid_t       indid;
6:       dbid_t        dbid;
7:       struct cache_binding *next;
8:  } CACHE_BINDING;
```

As described above, the cache_binding structure is consulted (e.g., queried) by recovery functionality with an object id (objid) or database id (dbid). It can also be consulted by another instance attempting to obtain cached pages from it with a cluster id (cid) as previously described. Some examples illustrating various operations in Shared Disk Cluster systems having different cache configurations are described below to further illustrate the system and methodology of the present invention.

Examples of Operations Involving Different Cluster Cache Configurations

Figure 6A:
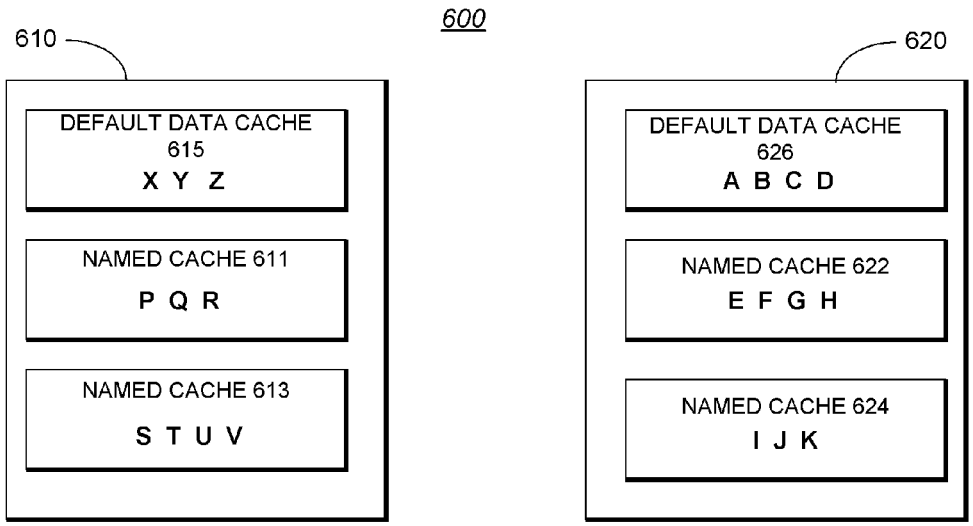
FIGS. 6A-B illustrate a failover scenario in a Shared Disk Cluster system environment in which the server instances have different cache configurations.
Figure 6B:
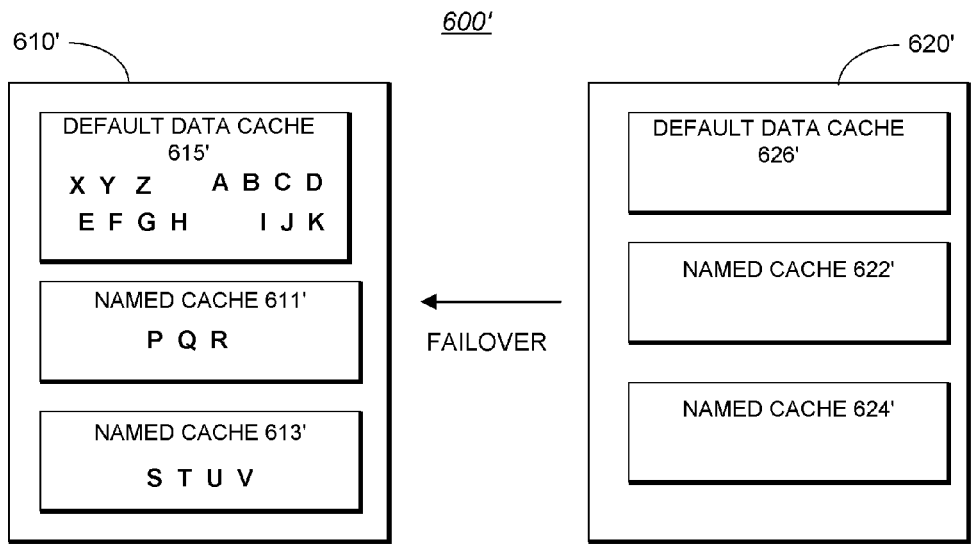

FIGS. 6A-B illustrate a failover scenario in a Shared Disk Cluster system environment 600 in which the server instances have different cache configurations. As shown at FIG. 6A, server (instance) 610 has three caches configured as shown at 615, 611, 613. The default data cache 615 includes three data objects X, Y and Z, which are not bound to any named caches. Cache 611 is a named cache having objects P, Q and R bound to it. Cache 613 is a named cache having objects S, T, V and U bound to it. Server (instance) 620 also has three caches 626, 622, 624 configured. Default data cache 626 includes four objects A, B, C and D, which are not bound to any named cache. Cache 622 is a named cache having objects E, F, G and H bound to it. Cache 624 is a named cache having objects I, J and K bound to it. FIG. 6A shows the above Shared Disk Cluster system environment 600 during normal operation.

FIG. 6B is a illustration of the same Shared Disk Cluster system environment (now 600') after one of the servers goes down (i.e., fails). As shown at FIG. 6B, after server 620' goes down, all the objects in cache on Server 620' will failover to the default data cache 615' in the surviving instance (i.e., server 610') when server 620' goes down. Default data cache 615' now includes data objects A, B, C, D, E, F, G, H, I, J and K (formerly in caches 622', 624' and 626') as well as objects X, Y and Z. Named cache 611' continues to hold data objects P, Q and R; while named cache 613' holds objects S, T, U and V.

Figure 7A:
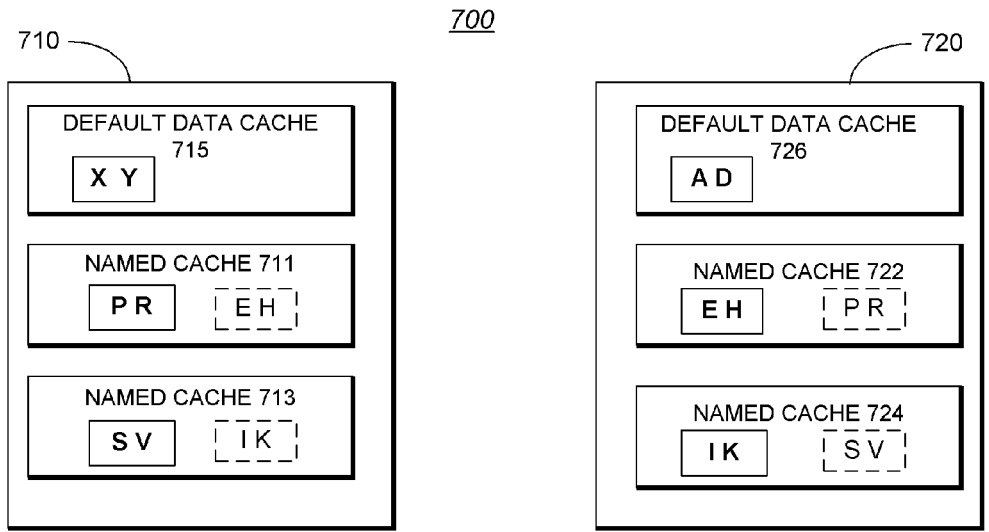
FIGS. 7A-B illustrate a failover scenario in a Shared Disk Cluster system environment in which objects are bound to multiple caches in different instances.
Figure 7B:
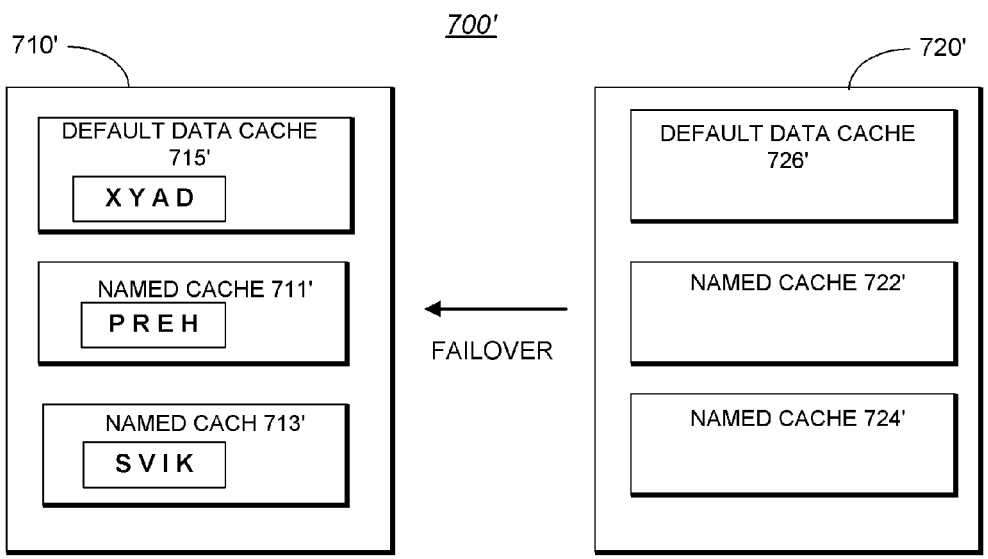

Another example is a case in which data objects are bound to multiple caches in different server instances. FIGS. 7A-B illustrate a failover scenario in a Shared Disk Cluster system environment 700 in which objects are bound to multiple caches in different instances. As shown at FIG. 7A, server 710 has three caches 715, 711, 713 configured. Default data cache 715 has data objects X and Y, which are not bound to any named caches. Cache 711 is a named cache having objects P and R bound to it and in cache. In addition it also has objects E and H bound to it; however, these objects E and H are not currently in cache. Cache 713 is a named cache having objects S and V bound to it and in cache. In addition, Cache 713 also has objects I and K bound to it. Server 720 also has three caches configured. Default data cache 726 on Server 720 has data objects A and D, which are not bound to any named cache. Cache 722 is a named cache having objects E and H bound to it and in cache. In addition it has objects P and R bound to it. Cache 724 is a named cache having objects I and K bound to it and in cache. In addition cache 724 has objects S and V bound to it.

FIG. 7B is an illustration of the same Shared Disk Cluster system environment (now 700') after one of the servers goes down (i.e., fails). By default, the default data cache is used as failover cache. As shown at FIG. 7B, the default data cache 715' on server 710' (the surviving instance) is the failover cache that will be used for objects which are not bound to any named cache in the surviving instance. As shown, data objects A and D which are not bound to either named cache 711' or 713' on server 710' are cached in the default data cache 715' (which is the failover cache) together with objects A and D. This failover cache is used after the failover has happened for caching objects of the failed instance (e.g., server 720'). Objects, which are not bound to any cache in the surviving instance, will use the failover cache. This failover cache does not need to be set aside and can be used by the instance by binding objects to that cache. As an operational practice, users should generally not bind critical objects to the cache, as the access performance will go down when the cache is deployed for failover functionality. Moreover, it is suggested that one should also have relatively fewer objects bound to the failover cache for similar reasons.

As data objects E and H are bound to named cache 711', such objects (together with previously-held objects P and R) are held in cache 711' after failover of server 720'. Similarly, data objects I and K (as well as S and V) are held in named cache 713' after failover as these objects are bound to named cache 713'. In this manner, the methodology followed at each instance in the event of failover is as previously discussed. Whenever a request is received at an instance for an operation on a particular data object, a check is first made to determine if the data object is bound to any named cache. If the object is not bound to any cache, the default data cache is used. However, if the object is bound to a named cache, a check is made to determine if the named cache exists on the current instance. If it does, then the named cache is used. Otherwise, if the data object is bound to a named cache from another instance, the failover cache (e.g., default data cache) is used for the operation.

Online Instance Recovery

During online instance recovery the recovery process can deploy named caches. If the objects in the failed instance are bound to different caches in the surviving instance, the recovery of such objects is performed in their respective bound caches and thus parallelism is achieved. Moreover, the present invention also supports the concept of recovery cache(s). During the online recovery the surviving instance can read the cache configuration and object binding information of the failed instance. For all the objects having a named cache binding in the failed instance and no binding in the surviving instance, the marked recovery cache can be used for recovering these objects. This approach enables improved online recovery performance. Some of the methods used in the currently preferred embodiment for creation of cache structures will next be described.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a shared disk cluster database system comprising a plurality of database server nodes sharing access to a single database, a method for temporarily storing data objects in memory of said shared disk cluster database system, the method comprising:

in a shared disk cluster database system comprising a plurality of database server nodes connected via high speed private interconnects and sharing access to a single database, reserving a portion of memory at each of said plurality of database server nodes as a default data cache for temporarily storing data objects;

in response to user input, allocating a portion of memory of at least one of said plurality of database server nodes as a named cache reserved for temporarily storing a specified type of data object;

maintaining cache binding information in an in-memory mapping structure at each database server node of the shared disk cluster;

in response to an operation at a particular database server node requesting a data object, determining whether the requested data object is of the specified type corresponding to the named cache at the particular database server node based on consulting cache binding information at the particular database server node;

if the data object is determined to be of the specified type corresponding to the named cache at the particular database server node, temporarily storing the requested data object in the named cache at the particular database server node; and otherwise, using the default data cache at the particular database server node for temporarily storing the requested data object.

2. The method of claim 1, wherein high speed private interconnects comprise selected ones of Gigabit Ethernet connections and Infiniband connections.

3. The method of claim 1, wherein the operation at the particular database server node comprises a database query.

4. The method of claim 1, wherein said allocating step includes binding a data object of said specified type to the named cache.

5. The method of claim 4, wherein said user input includes executing a stored procedure for binding data objects to the named cache.

6. The method of claim 4, wherein said cache binding information maintained at the particular database server node includes information indicating the data object of said specified type is bound to the named cache.

7. The method of claim 4, wherein the named cache is allocated in memory at a plurality of database server nodes and binding the data object includes binding the data object to the named cache at each of said plurality of database server nodes.

8. The method of claim 7, further comprising:
in response to failover of a first database server node, temporarily storing data objects bound to the named cache at the first database server node in a corresponding named cache at a second database server node.

9. The method of claim 1, wherein said determining step includes determining whether the named cache exists at the particular database server node.

10. The method of claim 1, further comprising:
partitioning the named cache into a plurality of separate memory pools; wherein at least some of said plurality of separate memory pools are of different sizes;
prior to temporarily storing a requested data object in the named cache, estimating size of the requested data object; and
selecting a particular memory pool for temporarily storing the requested data object based on its estimated size.

11. The method of claim 1, wherein said allocating step includes allocating a plurality of different named caches and binding objects of specified types to each of said plurality of named caches.

12. The method of claim 11, wherein said allocating a plurality of different named caches includes allocating more than one different named cache on a particular database server node, so that data objects of different types are allocated to different named caches on the particular database server node.

13. The method of claim 1, wherein said temporarily storing step includes temporarily storing at least one data page including the requested data object in the named cache.

14. The method of claim 1, wherein said temporarily storing step includes:
maintaining a queue of data objects temporarily stored in the named cache at a particular database server node based on how recently each data object is used, wherein least-recently used data objects are displaced from the named cache by more-recently used data objects.

15. The method of claim 1, wherein said temporarily storing step includes reading the requested data object into the named cache from disk storage.

16. The method of claim 15, further comprising:
before reading the requested data object into the named cache from disk storage, determining whether the requested data object is already stored in the named cache; and
if the requested data object is already stored in the named cache, accessing the data object in the named cache for performing the operation, so as to avoid reading the requested data object from disk storage.

17. A computer-readable medium having processor-executable instructions for performing the method of claim 1.

18. The method of claim 1, further comprising:
downloading a set of processor-executable instructions for performing the method of claim 1.

19. In a shared disk cluster database system comprising a plurality of database server nodes sharing access to a single database, a system for storing data objects in memory, the system comprising:

a plurality of database server nodes connected via high speed private interconnects and sharing access to a single database,
a named cache comprising an allocated portion of memory of at least one of said plurality of database server nodes for storing specified data objects;
a module for binding data objects to the named cache based on user input and distributing cache binding information to an in-memory mapping structure at each database server node of the shared disk cluster;
a module for determining, in response to an operation at a particular database server node requesting a data object, whether the requested data object has a binding to the named cache at the particular database server node based on consulting the cache binding information at the particular database server node;
a module for storing the requested data object in the named cache at the particular database server node if the data object is determined to have a binding to the named cache; and
a default data cache comprising a reserved portion of memory at each of said plurality of database server nodes for temporarily storing data objects without a binding to the named cache.

20. The system of claim 19, wherein said high speed private interconnects comprise selected ones of Gigabit Ethernet connections and Infiniband connections.

21. The system of claim 19, wherein the operation at the particular database server node comprises a Structured Query Language (SQL) command submitted by a client to said particular database server node.

22. The system of claim 19, wherein the module for binding provides for binding data objects of user specified types to the named cache.

23. The system of claim 19, wherein said user input includes executing a stored procedure for binding specified data objects to the named cache.

24. The system of claim 19, wherein the module for determining consults named cache binding information maintained at the particular database server node.

25. The system of claim 19, wherein the named cache is allocated in memory at more than one database server node and said module for binding the data object binds the data object to the named cache at each of said more than one database server node.

26. The system of claim 25, wherein said module for storing at a first database server node operates in response to failover of a second database server node by storing data objects bound to the named cache at the second database server node in a corresponding named cache at the first database server node.

27. The system of claim 19, wherein the module for determining determines whether the named cache exists at the particular database server node.

28. The system of claim 19, wherein the named cache is partitioned into a plurality of separate memory pools wherein at least some of said plurality of separate memory pools are of different sizes and the module for storing selects a memory pool for storing the requested data object based on estimated size of the requested data object.

29. The system of claim 28, wherein the named cache partitioning is user configurable such that the user can specify sizes of said separate memory pools.

30. The system of claim 28, wherein the named cache is allocated on more than one database server node and the named cache is partitioned differently on different database server nodes.

31. The system of claim 19, wherein said module for storing stores at least one data page including the requested data object in the named cache.

32. The system of claim 19, wherein said module for storing maintains a queue of data objects stored in the named cache at a particular database server node based on how recently each data object is used, wherein least-recently used data objects are displaced from the named cache by more-recently used data objects.

33. The system of claim 19, wherein said module for storing reads the requested data object into the named cache from disk storage.

34. The system of claim 33, further comprising:
 a module for determining whether the requested data object is already stored in the named cache before reading the requested data object into the named cache from disk storage, so as to avoid reading the requested data object from disk storage if it is already in the named cache.

35. A system for managing storage of data objects in a shared disk cluster database system comprising a plurality of database servers sharing access to a database, the system comprising:
 one or more storage devices on which data objects of a database are persistently stored;
 a plurality of database servers connected via high speed private interconnects and sharing access to the database persistently stored on said one or more storage devices, wherein each of said plurality of database servers includes memory for temporarily storing data objects;
 a portion of the memory of at least one of said plurality of database servers allocated as a named buffer cache for specified data objects, so as to provide more efficient access to said specified data objects in response to database operations;
 a module for binding specified data objects to the named buffer cache based on user input, so that the specified data objects will be stored in the named buffer cache during database operations;
 an in-memory mapping structure at each database server maintaining object to named buffer cache binding information; and
 a module for storing a particular data object requested by a database operation at a given database server in the named buffer cache if said particular database object is bound to the name cache available at the given database server.

36. The system of claim 35, wherein said user input includes executing a stored procedure for binding specified data objects to the named cache.

37. The system of claim 35, wherein the named buffer cache is allocated in memory at more than one database server and said module for binding binds the specified data objects to the named cache at each of said more than one database server.

38. The system of claim 37, wherein said module for storing at a first server operates in response to failover of a second server by storing data objects bound to the named buffer cache at the second server in a corresponding named buffer cache at the first server.

39. The system of claim 35, wherein the named cache is partitioned into a plurality of separate memory pools wherein at least some of said plurality of separate memory pools are of different sizes and the module for storing selects a memory pool for storing the particular data object based on estimates of its size.

40. The system of claim 39, wherein the named buffer cache partitioning is user configurable such that the user can specify sizes of said separate memory pools.

41. The system of claim 35, wherein said module for storing retains data objects in the named buffer cache at a particular server based on how recently each data object is used such that least-recently used data objects are displaced from the named buffer cache by more-recently used data objects.

42. The system of claim 35, wherein said module for storing reads the requested data object into the named buffer cache from disk storage.

43. The system of claim 42, further comprising:
 a module for determining whether the requested data object is already stored in the named buffer cache before reading the requested data object into the named buffer cache from disk storage, so as to avoid reading the requested data object from disk storage if it is already in the named buffer cache.

* * * * *